United States Patent [19]

Matsumoto

[11] Patent Number: 5,106,704
[45] Date of Patent: Apr. 21, 1992

[54] OVER WRITE CAPABLE MAGNETOOPTICAL RECORDING MEDIUM

[75] Inventor: Hiroyuki Matsumoto, Tokyo, Japan

[73] Assignee: Nikon Corporation, Tokyo, Japan

[21] Appl. No.: 481,203

[22] Filed: Feb. 20, 1990

[30] Foreign Application Priority Data

Feb. 23, 1989 [JP] Japan ................................ 1-43562

[51] Int. Cl.$^5$ .................................................. G11B 5/66
[52] U.S. Cl. ..................................... 428/694; 360/131;
 360/135; 365/122; 369/13; 369/14; 428/900
[58] Field of Search ............... 428/694, 900; 360/131, 360/135; 365/122; 369/13, 14

[56] References Cited

U.S. PATENT DOCUMENTS 4,799,114 1/1989 Tsunashima ........................ 360/59
4,855,975 8/1989 Akasaki .............................. 369/13
4,871,614 10/1989 Kobayashi ......................... 428/336

FOREIGN PATENT DOCUMENTS 282356 9/1988 European Pat. Off. .

OTHER PUBLICATIONS

Swartz et al., "The Bell System Technical Journal", (Sep. 1983), vol. 62, pp. 1923–1936.

Primary Examiner—Marion E. McCamish
Assistant Examiner—Robert J. Follett
Attorney, Agent, or Firm—Shapiro and Shapiro

[57] ABSTRACT

An over write capable magnetooptical recording medium comprises a substrate and magnetic layers including first and second layers each having a perpendicular magnetic anisotropy. In the medium, a product of a saturated magnetic moment and a coercivity of the first layer is larger than that of the second layer, and nonmagnetic element is doped in the first layer.

15 Claims, 23 Drawing Sheets

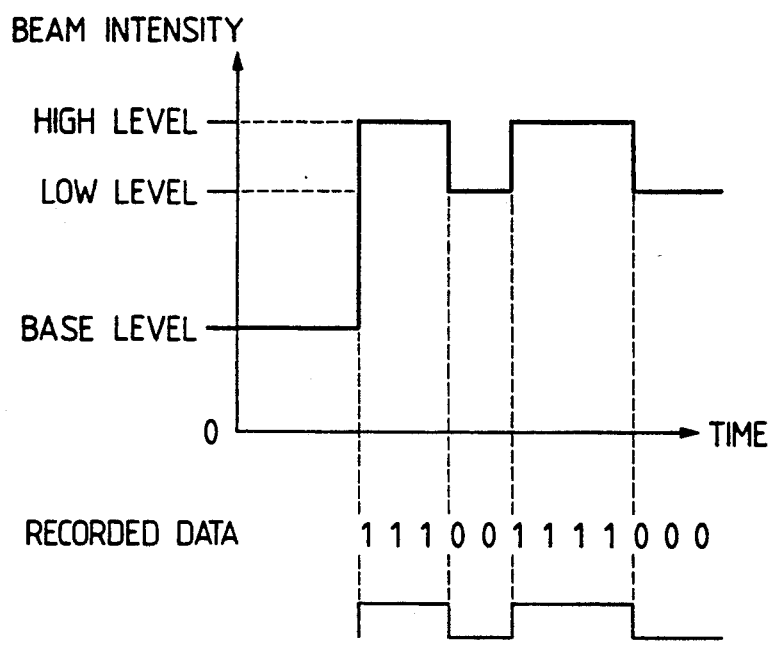

FIG. 8
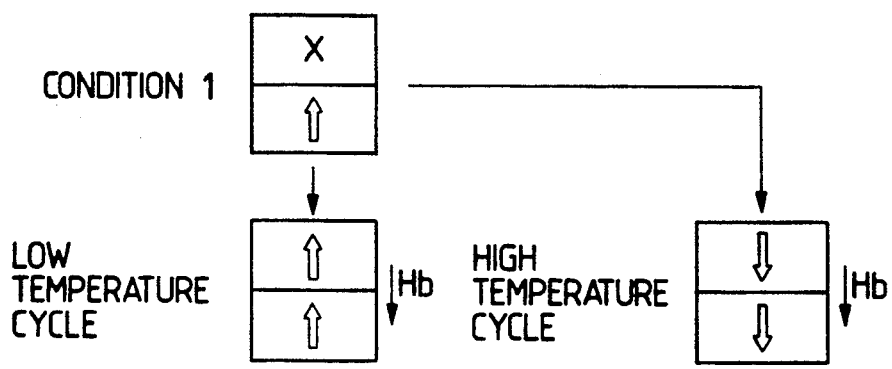
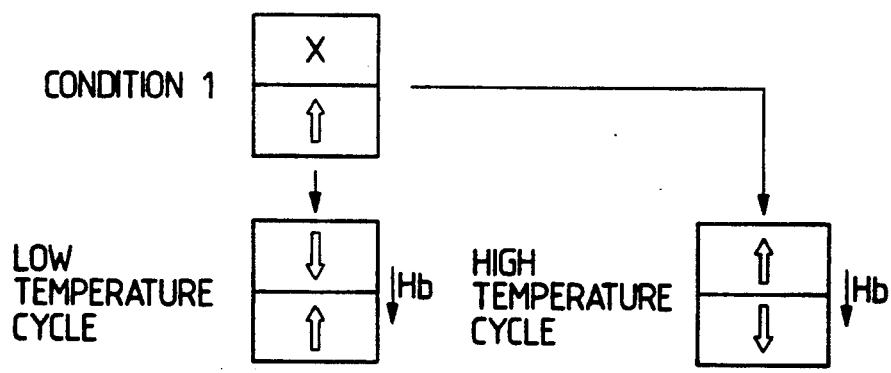

FIG. 13
FIG. 14
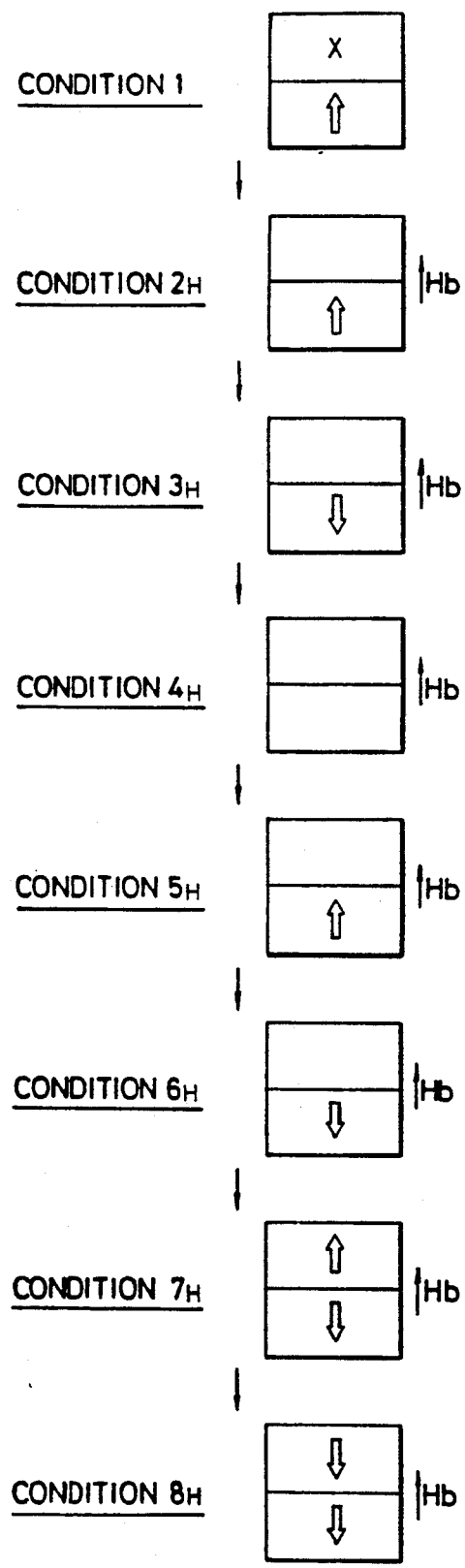
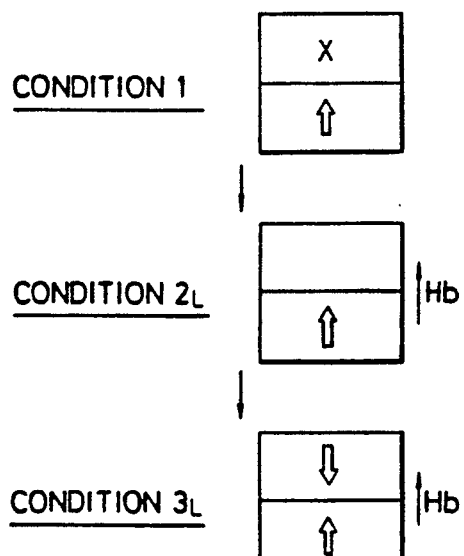

FIG. 16
FIG. 17
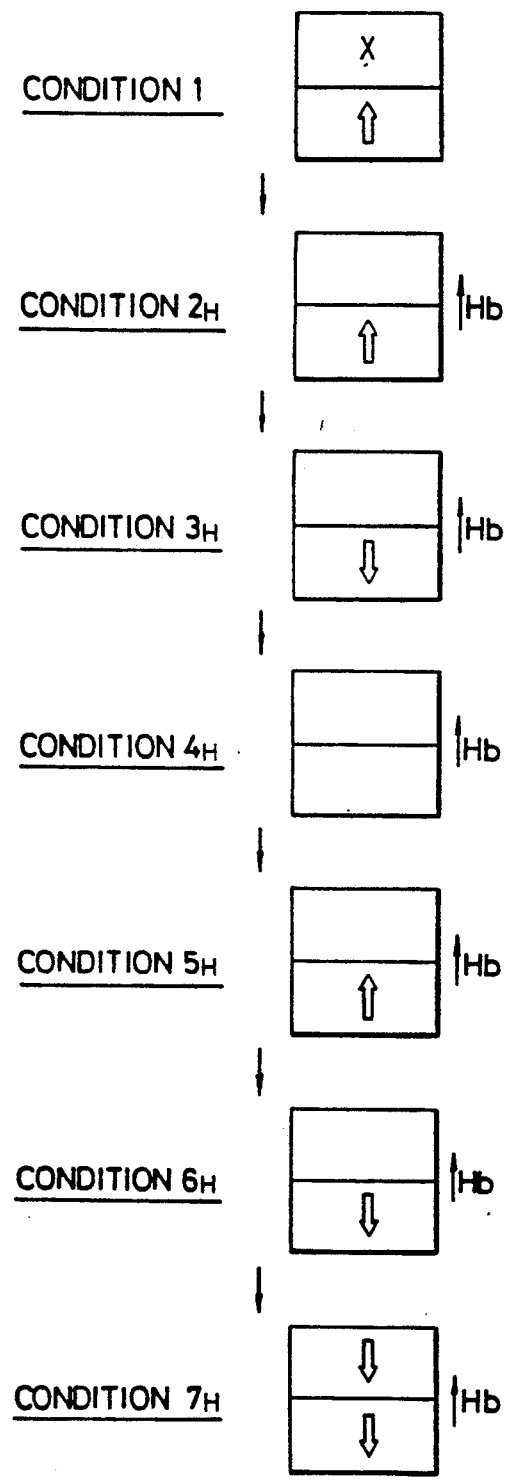
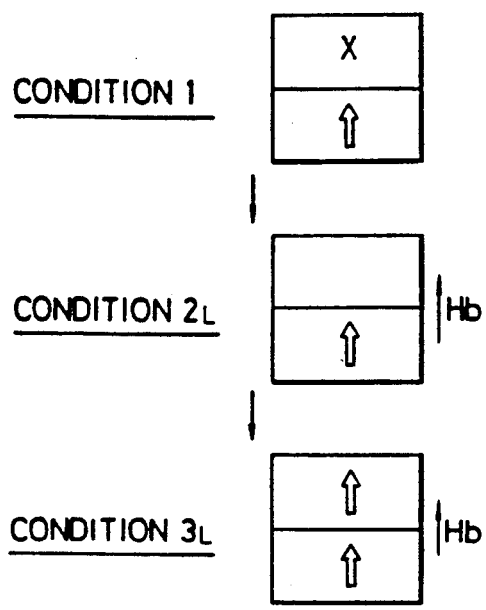

FIG. 22
FIG. 23
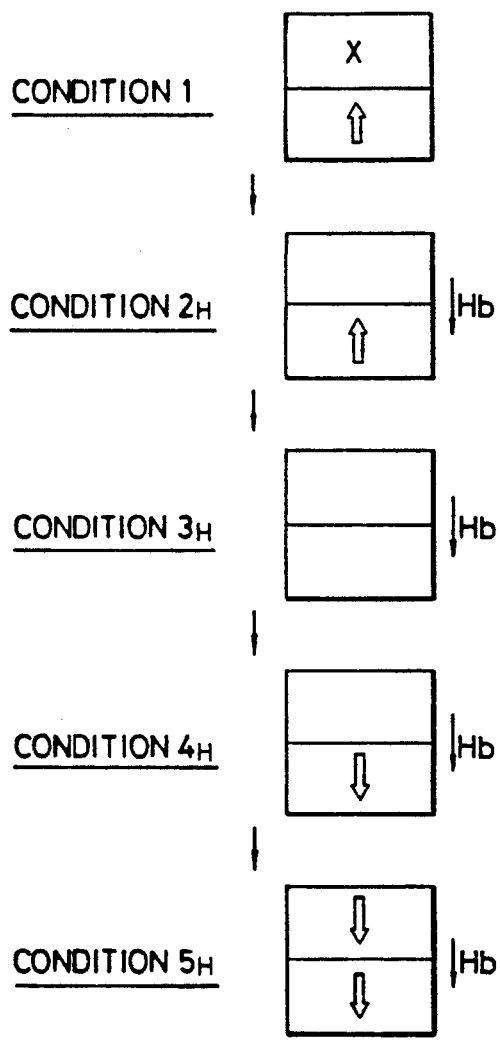
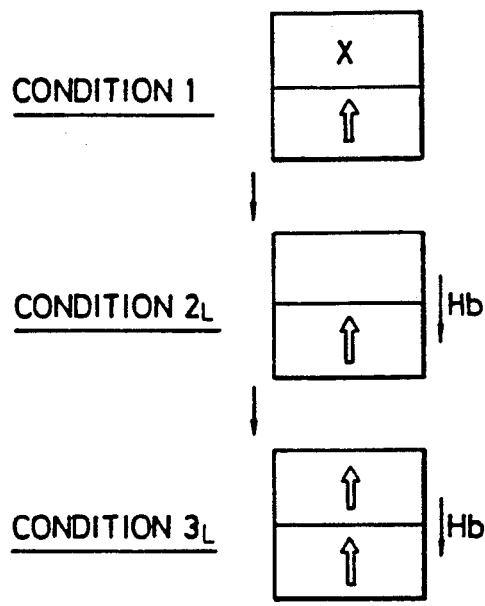

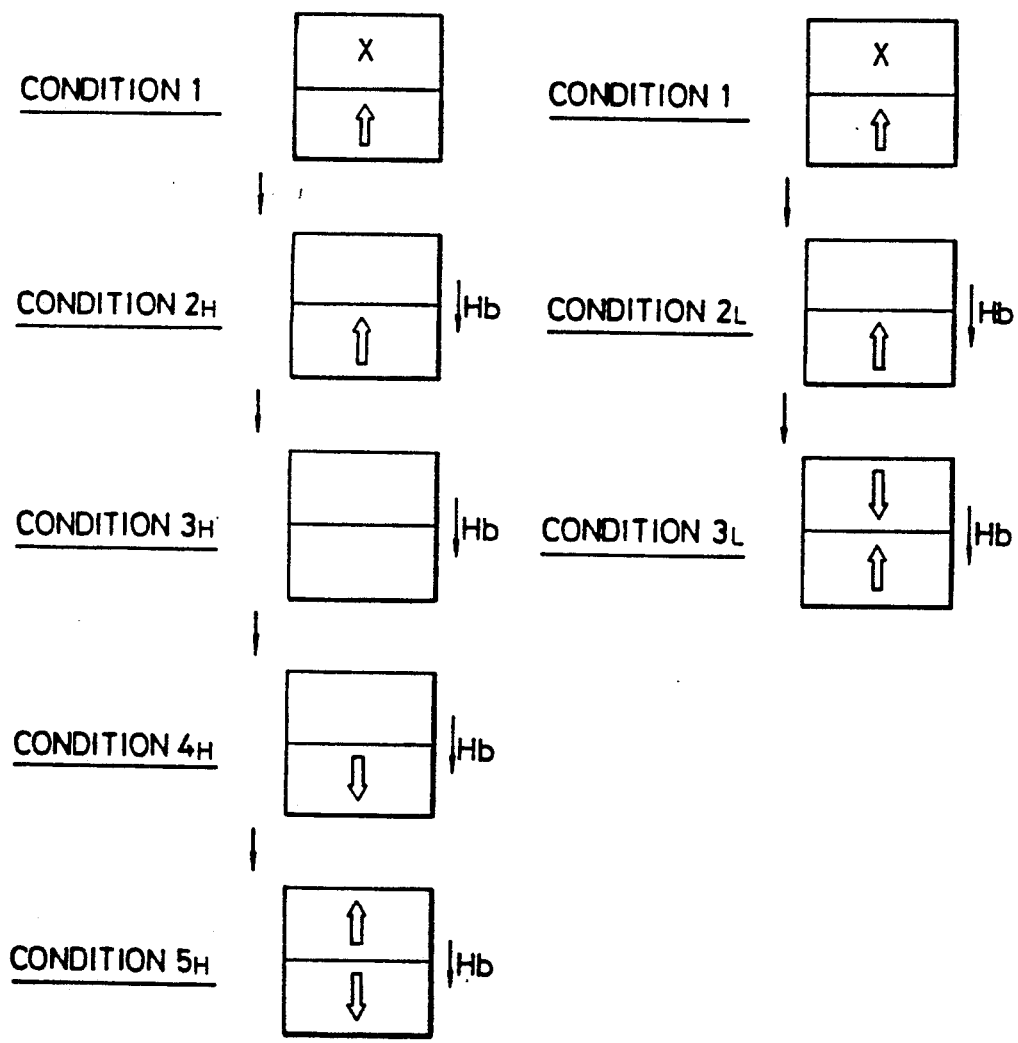

FIG. 34
FIG. 35
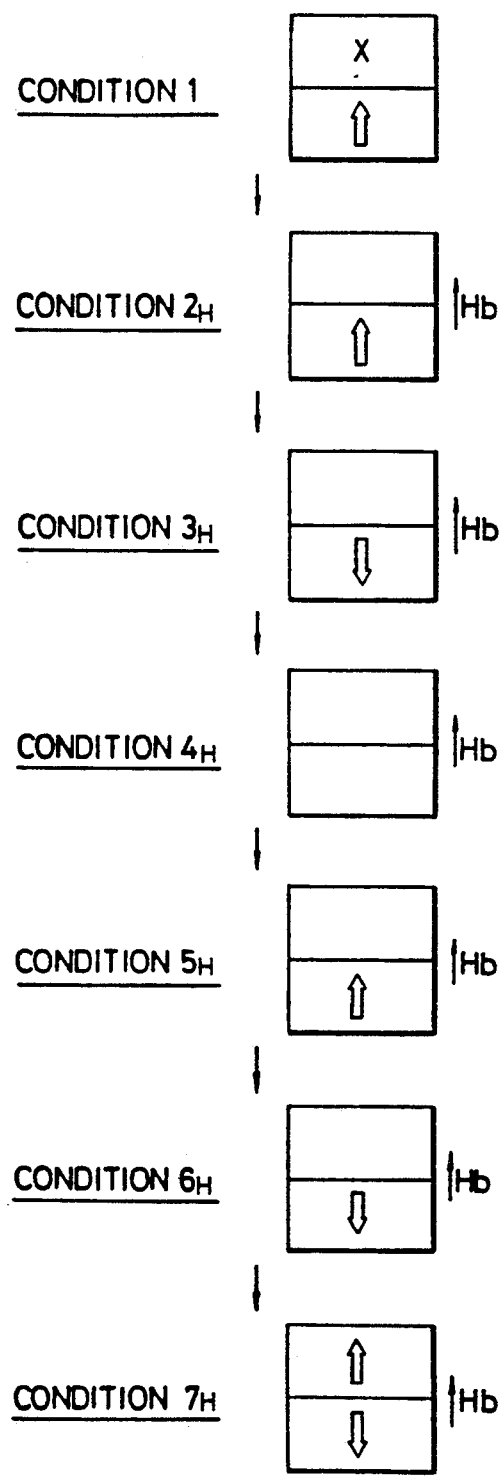
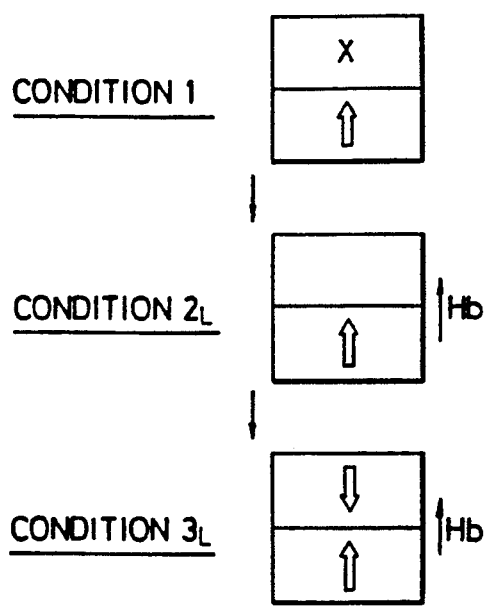

FIG. 37
FIG. 38
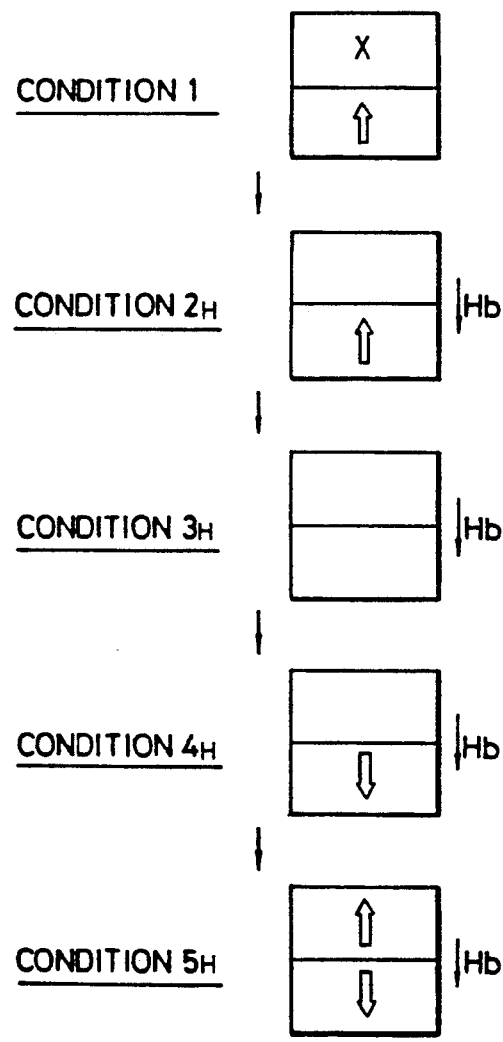
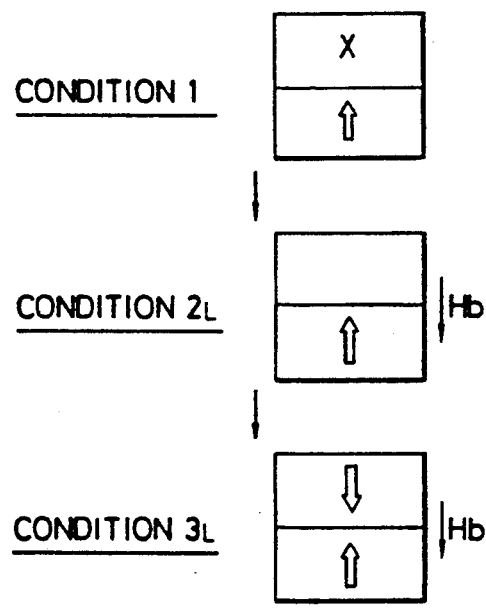

OVER WRITE CAPABLE MAGNETOOPTICAL RECORDING MEDIUM

BACKGROUND OF THE INVENTION

1. Field of the Invention

The present invention relates to an over write capable magnetooptical recording medium having a controlled exchange coupling force between magnetic layers.

2. Related Background Art

In recent years, many efforts have been made to develop an optical recording/reproduction method, an optical recording apparatus and a medium used therefor, which can satisfy various requirements including high density, large capacity, high speed access, and high recording/reproduction speed.

Of various optical recording/reproduction methods, the magnetooptical recording/reproduction method is most attractive due to its unique advantages that information can be erased after use and new information can be written thereon.

A recording medium used in a magnetooptical recording/reproduction method has a perpendicular magnetic layer or layers as a recording layer. The magnetic layer comprises, for example, amorphous GdFe, GdCo, GdFeCo, TbFe, TbCo, TbFeCo, and the like. Concentrical or spiral tracks are formed on the recording layer, and data is recorded on the tracks. Note that in this specification, one of the "upward" and "downward" directions of magnetization with respect to a film surface is defined as an "A direction" and the other one is defined as a "non-A direction". Data to be recorded is binarized in advance, and is recorded by a mark or bit ($B_1$) having "A-directed" magnetization and a mark or bit ($B_0$) having "non-A-directed" magnetization. These marks $B_1$ and $B_0$ correspond to "1" and "0" levels of a digital signal, respectively. However, in general, the direction of magnetization of the recording tracks can be aligned in the "non-A direction" by applying a strong bias field before recording. This processing is called "initialization". Thereafter, the mark ($B_1$) having "A-directed" magnetization is formed on the tracks. Data is recorded in accordance with the presence/absence and/or a mark length of the mark ($B_1$).

Principle of Mark Formation

In the mark formation, a characteristic feature of laser, i.e., excellent coherence in space and time, is effectively used to focus a beam into a spot as small as the diffraction limit determined by the wavelength of the laser light. The focused light is radiated onto the track surface to write data by producing marks less than 1 $\mu$m in diameter on the recording layer. In the optical recording, a recording density up to $10^8$ mark/cm$^2$ can be theoretically attained, since a laser beam can be concentrated into a spot with a size as small as its wavelength.

As shown in FIG. 1, in the magnetooptical recording, a laser beam L is focused onto a recording layer 1 to heat it, while a bias field (Hb) is externally applied to the heated portion in the direction opposite the initialized direction. A coersivity Hc of the locally heated portion is decreased below the bias field (Hb). As a result, the direction of magnetization of that portion is aligned in the direction of the bias field (Hb). In this way, reversely magnetized marks are formed.

Ferromagnetic and ferrimagnetic materials differ in the temperature dependencies of the magnetization and Hc. Ferromagnetic materials have Hc which decreases around the Curie temperature and allow data recording based on this phenomenon. Thus, data recording in ferromagnetic materials is referred to as Tc recording (Curie temperature recording).

On the other hand, ferrimagnetic materials have a compensation temperature, below the Curie temperature, at which magnetization (M) becomes zero. The Hc abruptly increases around this temperature and hence abruptly decreases outside this temperature. The decreased Hc is cancelled by a relatively weak bias field (Hb). Namely, recording is enabled. This process is called Tcomp. recording (compensation point recording).

In this case, however, there is no need to adhere to the Curie point or temperature therearound, and the compensation temperature. In other words, if a bias field (Hb) capable of cancelling a decreased Hc is applied to a magnetic material having the decreased Hc at a predetermined temperature higher than a room temperature, recording is enabled.

Principle of Reading

FIG. 2 illustrates the principle of data reading based on the magnetooptical effect. Light is an electromagnetic wave with an electromagnetic-field vector normally emanating in all directions in a plane perpendicular to the light path. When light is converted to linearly polarized beams (Lp) and radiated onto a recording layer (1), it is reflected by or passes through the recording layer (1). At this time, the plane of polarization rotates according to the direction of magnetization (M). This phenomenon is called the magnetic Kerr effect or magnetic Faraday Effect.

For example, if the plane of polarization of the reflected light rotates through $\theta_k$ degrees for "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by "non-A-direction" magnetized mark ($B_0$) cannot pass through the analyzer. On the contrary, a product (X sin$2\theta_k$)$^2$ of the light reflected by a mark ($B_1$) magnetized along the "A direction" passes through the analyzer and becomes incident on a detector (photoelectric conversion means). As a result, the mark ($B_1$) magnetized along the "A direction" looks brighter than the mark ($B_0$) magnetized along the "non-A-direction", and the detector produces a stronger electrical signal for the mark ($B_1$). The electrical signal from the detector is modulated in accordance with the recording data, thus reading the data.

It is conventionally difficult to find one magnetic material which has a low Curie temperature, allows easy recording, and has a high coercivity, large $\theta_k$, and a high C/N ratio in a reproduction (read) mode. For this reason, a multilayered magnetooptical recording medium in which necessary functions are separated, and layers of two different magnetic materials are stacked has been proposed (U.S. Pat. No. 4,799,114). This recording medium consists of two film layers, i.e., a high-coercivity layer which can be perpendicularly magnetized and has a low Curie temperature, and a low-coercivity layer which can be perpendicularly magnetized and has a high Curie temperature. The high- and low-coercivity layers are exchange-coupled to each other. Thus, the high-coercivity layer having a low Curie temperature is subjected to information recording and preservation. Since the recorded information is transferred to the low-coercivity layer, the low-coercivity layer having a high Curie temperature and large θk is subjected to read access of information.

A multilayered magnetooptical recording medium which has a first layer as a recording layer and a second layer as a reference layer, and realizes an over-write operation by only light modulation utilizing differences of exchange coupling forces $\sigma_w$, Curie temperatures, and coercivities of these layers has been invented and filed in a patent application (Japanese Patent Laid-Open No. 62-175948). This application will be quoted as a "prior application" hereinafter. In the specification of the prior application, the exchange coupling force $\sigma_w$ is referred to as an interface wall energy.

DESCRIPTION OF INVENTION (TWO-LAYER OVER WRITE) OF PRIOR APPLICATION

In an over-write operation of the invention of the prior application, only light is modulated, and a recording magnetic field is not modulated. It is difficult to modulate a magnetic field at high speed. More specifically, a laser beam used in recording is pulse-modulated in accordance with information to be recorded. Such an operation has been performed in conventional magnetooptical recording, and means for pulse-modulating a beam intensity according to binary information to be recorded is well known. For example, this means is described in detail in THE BELL SYSTEM TECHNICAL JOURNAL, Vol. 62 (1983), 1923-1936.

One characteristic feature of tee over-write operation of the invention of the prior application is high and low levels of a beam intensity. More specifically, when the beam intensity is at high level, an "A-directed" magnetization of a reference layer (second layer) is reversed to a "non-A direction" by a bias field (Hb), and a mark having a "non-A-directed" magnetization (or "A-directed" magnetization) is formed in a recording layer (first layer) by the "non-A-directed" magnetization of the second layer. When the beam intensity is at low level, a mark having an "A-directed" magnetization (or "non-A-directed" magnetization) is formed in the reference layer by the "A-directed" magnetization of the reference layer.

A beam is not a single beam but "two proximate beams". A first beam is turned on at low level and is not modulated in principle, thereby always forming a "non-A-directed (or "A-directed") mark, i.e., erasing previous information. A second beam is pulse-modulated between high level and base level (including zero level) equal to or lower than the low level in accordance with information, so that an "A-directed (or "non-A-directed") mark is formed to record information (FIG. 3).

In either case, if necessary high and low levels, and base level as needed are given, it is easy for those who are skilled in the art to modulate a beam intensity as described above by partially modifying a modulation means described in the above known application.

In a ∘∘∘ (or ΔΔΔ) expression, if you read ooo outside the parentheses, you should read ooo outside the parentheses in the following ∘∘∘ (or ΔΔΔ) expressions. On the contrary, if you select and read ΔΔΔ in the parentheses without reading ooo, you should read ΔΔΔ outside the parentheses without reading ooo in the following ∘∘∘ (or ΔΔΔ) expressions.

An over write capable medium consists of at least two magnetic layers each having a perpendicular magnetic anisotropy. In this medium, a first layer serves as a recording layer, and a second layer serves as a reference layer.

The invention of the prior application is divided into first and second aspects. In both the aspects, the recording medium has a multilayered structure, which is divided into two layers, as shown in FIG. 4A.

The first layer is the recording layer, which exhibits high coersivity at room temperature and has low reversing temperature. The second layer is the reference layer, which exhibits low coersivity at room temperature and has a higher reversing temperature than the first layer. Both the layers comprise perpendicular magnetic layers.

Note that each o the first and second layers may comprise a multilayered film.

In the first aspect, the coersivity of a first layer is represented by $H_{C1}$; that of a second layer $H_{C2}$; the Curie temperature of the first layer, $T_{C1}$; that of the second layer, $T_{C2}$; the room temperature, $T_R$; the temperature of the recording medium when a low level laser beam is radiated, $T_L$; that when a high level laser beam is radiated, $T_H$; a coupling field applied to the first layer, $H_{D1}$; and a coupling field applied to the second layer, $H_{D2}$. In this case, the recording medium satisfies the following Formula 1, and satisfies Formulas 2 to 5 at the room temperature.

$$T_R < T_{C1} \approx T_L < T_{C2} \approx T_H \quad (1)$$

$$H_{C1} > H_{C2} + |H_{D1} \mp H_{D2}| \quad (2)$$

$$H_{C1} > H_{D1} \quad (3)$$

$$H_{C2} > H_{D2} \quad (4)$$

$$H_{C2} + H_{D2} < |H_{ini.}| < H_{C1} \pm H_{D1} \quad (5)$$

In the above formula, symbol "≈" means "equal to" or "substantially equal to". In addition, of double signs ∓ and ∓, the upper sign corresponds to an A (antiparallel) type medium, and the lower sign corresponds to a P (parallel) type medium (these media will be described later) Note that the P type medium includes a ferromagnetic material and a magnetostatic coupling medium.

The relationship between the coersivity and the temperature is as shown in the graph of FIG. 5. Referring to FIG. 5. The thin curve represents the characteristics of the first layer and the bold curve represents those of the second layer.

Therefore, when an initial field (Hini.) is applied to the recording medium at room temperature, the direction of magnetization of the second layer is reversed without reversing that of the first layer, according to Formula 5. When the initial field (Hini.) is applied to the recording layer before recording, the second layer can be magnetized in the "A direction" (in the drawings, the "A direction" is indicated by an upward arrow, and the "non-A direction" is indicated by a downward arrow). If the initial field (Hini.) is decreased to zero, the direction of magnetization of the second layer can be left unchanged without being re-reversed, according to Formula 4.

FIG. 4B schematically shows a state wherein only the second layer is magnetized in the "A direction" immediately before recording.

Referring to FIG. 4B the direction of magnetization in the first layer represents previously recorded data. Since the direction of magnetization in the first layer 1 does not change the basic operation mechanism, it is indicated by X in the following description. The table in FIG. 4B is modified as shown in Condition 1 in FIG. 6 for the sake of simplicity.

In Condition 1, the high-level laser beam is radiated onto the recording meidum to increase the medium temperature to $T_H$. Since $T_H$ is high than the Curie temperature $T_{C1}$, magnetization of the first layer 1 disappears. In addition, since $T_H$ is near the Curie temperature $T_{H2}$, magnetization of the second layer 2 also disappears completely or almost completely. The bias field (Hb) in the "A direction" or "non-A direction" is applied to the medium in accordance with the type thereof. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam and is cooled by air. When the temperature of the medium is decreased under the presence of the field Hb, the direction of magnetization of the second layer is reversed to the "non-A direction" based on the field Hb (Condition 2H in FIG. 6).

When the medium is further cooled and the medium temperature is decreased below $T_{C1}$, magnetization of the first layer appears again. In this case, the direction of magnetization of the first layer is influenced by that of the second layer due to a magnetic coupling (exchange or magnetostatic coupling) force. As a result, "non-A directional" magnetization (the P type medium) or "A directional" magnetization (the A type medium) is formed in accordance with the type of the medium, as shown in Condition $3_H$ in FIG. 6.

A change in conditions due to high-level laser beam irradiation is called a high-temperature cycle herein.

Next, in Condition 1 in FIG. 7, the low-level laser beam is radiated onto the medium to increase the medium temperature to $T_L$. Since $T_L$ is near the Curie temperature $T_{C1}$, magnetization of the first layer disapperas completely or almost completely. However, since $T_L$ is below the Curie temperature $T_{C2}$, magnetization of the second layer does not disappear (condition $2_L$ in FIG. 7). In Condition $2_L$, although the bias field (Hb) is unnecessary, it cannot be turned on or off at high speed. Therefore, the bias field (Hb) is left applied inevitably.

However, since the coersivity $H_{C2}$ is maintained high, the direction of magnetization of the second layer will not be reversed due to the field Hb. Since the medium is moving, a given irradiated portion is immediately separated apart from the laser beam and is cooled by air. As cooling progresses, magnetization of the first layer appears. The direction of magnetization is influenced by that of the second layer due to the magnetic coupling force. As a result, "A directional" magnetization (the P type medium) or "non-A directional" magnetization (the A type medium) appears in accordance with the type of the medium. This magnetization is not changed even at the room temperature (Condition $3_L$ in FIG. 7).

A change in conditions due to low-level laser beam irradiation is called a low-temperature cycle herein.

FIG. 8 summarizes the above descriptions. Refering to FIG. 8, marks, having either "A directional" magnetization or "non-A directional" magnetization, which are opposite to each other, are formed in the high- and low-temperature cycles regardless of the direction of magnetization in the first layer. More specifically, an over-write operation is enabled by pulse modulating the laser beam between high level (high-temperature cycle) and low level (low-temperature cycle) in accordance with data to be recorded.

Note that the recording medium normally has a disk shape, and is rotated during recording. For this reason, a recorded portion mark is again influenced by the initial field (Hini.) which is applied by initial field apply means during a single rotation. As a result, the direction of magnetization of the second layer is aligned along the original "A direction". However, at the room temperature magnetization of the first layer, and the recorded data can be held.

If linearly polarized light is radiated onto the first layer, since light reflected thereby includes data, data can be reproduced as in the conventional magnetooptical recording medium.

A perpendicular magnetic film constituting the first layer and the second layer is selected from the group consisting of (1) crystalline or amorphous ferromagnetic or ferrimagnetic materials having the Curie temperature and no compensation temperature, and (2) crystalline or amorphous ferrimagnetic materials having both the compensation temperature and the Curie temperature.

The first aspect utilizing the Curie temperature has been described. In contrast to this, the second aspect of the present invention utilizes decreased coersivity $H_C$ at a predetermined temperature exceeding the room temperature. The second aspect uses a temperatue $T_{S1}$ at which the first layer is magnetically coupled to the second layer, in place of the temperature $T_{C1}$ in the first aspect. In addition, instead of the temperature $T_{C2}$, a temperature $T_{S2}$ at which the second layer is reversed under the influence of the field Hb is used. Thereby, the second aspect can provide the same effect as in the first aspect.

In the second aspect, the coersivity of the first layer is represented by $H_{C1}$: that of the second layer, $H_{C2}$; a temperature at which the first layer is magnetically coupled to the second layer, $T_{S1}$; a temperature at which the direction of magnetization of the second layer is reversed upon influence of the field Hb, $T_{S2}$; room temperature, $T_R$; a temperature of the medium when a low-level laser beam is applied thereto, $T_L$; a temperature of the medium when a high-level laser beam is applied thereto $T_H$, a coupling filed applied to the first layer. $H_{D1}$; and a coupling field applied to the second layer $H_{D2}$. In this case, the recording medium satisfies the following Formula 6, and satisfies Formulas 7 to 10 at the room temperature.

$$T_R < T_{S1} \approx T_L < T_{S2} \approx T_H \quad (6)$$

$$H_{C1} > H_{C2} + |H_{D1} \mp H_{D2}| \quad (7)$$

$$H_{C1} > H_{D1} \quad (8)$$

$$H_{C2} > H_{D2} \quad (9)$$

$$H_{C2} + H_{D2} < |\Box Hini.| < H_{C1} \pm H_{D1} \quad (10)$$

In the above formulas, upper signs of double and $\mp$ and $\mp$ correspond to an A (antiparallel) type medium, and lower signs correspond to a P (parallel) type medium (these media will be descrbed later).

In the first and second aspects, the recording medium is constituted by the first and second layers, each of the which preferably comprises an amorphous ferrimagnetic material selected from transition metal (e.g., Fe, Co)—heavy rare earth metal (e.g., Gd, Tb, Dy, and the like) alloy compositions.

When the first and second layers are both selected from the transition metal—heavy rare earth metal alloy compositions, the direction and level of magnetization appearing outside the alloy are determined by the relationship between the direction and level of spin of transition metal atoms (to be referred to as TM hereinafter) and those of heavy rare earth metal atoms (to be referred to as RE hereinafter) inside the alloy. For example, as shown in FIG. 9A, the direction and level of TM spin are represented by a dotted vector TM-1, those of RE spin are indicated by a solid vector RE-1, and the direction and level of magnetization of the alloy as a whole are represented by a double-solid vector MA-1. In this case, the vector MA-1 is represented by a sum of vectors TM-1 and RE-1. However, in the alloy, the vectors TM and RE are directed in the opposite directions due to the mutual effect of the TM spin and the RE spin. Therefore, when these vectors are equal to each other, the sum of vecotrs TM-2 and RE-1 or the sum of vectors TM-2 and RE-1 is zero (i.e., the level of magnetization appearing outside the alloy is zero). The alloy composition making the sum of vectors zero is called a compensation composition. When the alloy the another composition, it has a strength equal to a difference between the strengths of both the spins, and has a vector (MA-1 or MA-2) having a direction equal to that of larger vector. Magnetization of this vector appears outside the alloy. For example, as shown in FIG. 9B, a pair of vectors correspond to a vector MA-1 (model 1), and a pair of vectors correspond to a vector MA-2 (model 2).

When one of the strength of the vectors of the RM spin and TM spin is larger than the other, the alloy composition is referred to as "XX rich" named after the larger spin name (e.g., RE rich).

The first and second layer can be classified into TM rich and RE rich compositions. Therefore, if the composition of the first layer is plotted along the ordinate and that of the second layer is plotted along the abscissa, the types of the recording media according to the present invention can be classified into four quardrants, as shown in FIG. 11. The P type medium described previously belongs to Quadrant I and III, and the A type medium belongs to Quadrant II and IV. Referring to FIG. 10, the intersection (origin) of the abscissa and the ordinate represents the compensation composition of both the layers.

In view of a change in coersivity against a change in temperatures, a certain alloy composition has characteristics wherein the coersivity temporarily increases infinitely and then abruptly decreases before a temperature reaches the Curie temperature (at which the coersivity is zero). The temperature corresponding to the infinite coersivity is called a compensation temperature (Tcomp.). No compensation temperature is present between the room temperature and the Curie temperature in the TM rich alloy composition. The compensation temperature below the room temperature is nonsense in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types.

The recording medium in Quadrant I includes all the four types of media. The graphs of FIGS. 11A to 11D respectively show the relationship between the coersivity and the temperature of the four types of media. Note that thin curves represent characteristics of the first layer and bold curves represent those of second layer.

When the first (recording) layer and the second (reference) layer are classified in view of their RE or TM rich characteristics and in view of the presence/absence of the compensation temperature, they can be classified into 9 classes.

TABLE 1

| Quadrant I | | | |
|---|---|---|---|
| Class | First Layer: RE rich | Second Layer: RE rich | Type |
| 1 | Tcomp. | Tcomp. | 1 |
| 2 | No Tcomp. | Tcomp. | 2 |
| 3 | Tcomp. | No Tcomp. | 3 |
| 4 | No Tcomp. | No Tcomp. | 4 |
| Quadrant II | | | |
| Class | First Layer: RE rich | Second Layer: TM rich | Type |
| 5 | Tcomp. | No Tcomp. | 3 |
| 6 | No Tcomp. | No Tcomp. | 4 |
| Quadrant III | | | |
| Class | First Layer: TM rich | Second Layer: TM rich | Type |
| 7 | No Tcomp. | No Tcomp. | 4 |
| Quadrant IV | | | |
| Class | First Layer: TM rich | Second Layer: RE rich | Type |
| 8 | No Tcomp. | Tcomp. | 2 |
| 9 | No Tcomp. | No Tcomp. | 4 |

The principle of the method of the present invention will be described in detail using a specific medium No. 1 belonging to Class 1 (P type, Quadrant I, Type 1) shown in Table 1.

The medium No. 1 satisfies Formula 11:

$$T_R < Tcomp.1 < T_{C1} \approx T_L \approx Tcomp.2 < T_{C2} \approx T_H \qquad (11)$$

The graph of FIG. 12 shows this relation. Note that thin curves indicate the first layer, and bold curves indicate the second layer. Those identifications are same in the following graphs.

A condition that reverses the direction of magnetization of the reference layer 2 without reversing that of the recording layer 1 by the initial field (Hini.) at the room temperature $T_R$ is represented by Formula 12. The medium No. 1 satisfies Formula 12 at the $T_R$.

$$H_{C1} > H_{C2} + (\sigma_w/2M_{S1}t_1) + (\sigma_w/2M_{S2}t_2) \qquad (12)$$

where $H_{C1}$: coersivity of recording layer 1
$H_{C2}$: coersivity of reference layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 15. If the Hini. disappears, reversed magnetization of the reference layer 2 is influenced by magnetization of the recording layer 1 due to an exchange coupling force. The condition that can hold the direction of magnetization of the layer 2 is represented by Formulas 13 and 14. The medium No. 1 satisfies Formulas 13 and 14.

$$H_{C1} > (\sigma_w/2M_{S1}t_1) \quad (13)$$

$$H_{C2} > (\sigma_w/2M_{S2}t_2) \quad (14)$$

$$H_{C2} + (\sigma_w/\text{bd } S2t_2) < |H_{ini.}| < H_{C1} - (\sigma_w/2M_{S1}t_1) \quad (15)$$

The layer 2's magnetization of the recording medium which can satisfy Formulas 12 to 14 at the $T_R$ is aligned along the "A direction" model 1, in FIG. 9B by the Hini. which satisfies Formula 15. At this time, the recording layer 1 is maintained in the recorded state (Condition 1 in FIGS. 13 and 14).

Condition 1 is held to a point immediately before the recording. In this case, the bias field (Hb) is applied in the upward direction.

The high-temperature cycle will now be described with reference to FIG. 13.

High-Temperature Cycle

In Condition 1, when the medium temperature is increased to $T_L$ upon irradiation of the high-level laser beam, since the temperature $T_L$ is substantially equal to the Curie temperature $T_{C1}$ of the recording layer 1, magnetization of the layer 1 disappears (Condition $2_H$).

When the laser-beam radiation further continues, the temperature of the medium increases accordingly. When the temperature of the medium slightly exceeds the temperature Tcomp.2 of the layer 2, the relationship between the strengths of the vectors is reversed (from the model 1 to the model 2, in FIG. 9B although the directions of the RE and TM spins remain the same. For this reason, the direction of magnetization of the layer 2 is reversed to be along the "non-A direction" (Condition $3_H$).

However, since the coersivity $H_{C2}$ is still high at this temperature, the direction of magnetization of the layer 2 will not be reversed by the field Hb. When the temperature further increases and reaches the temperature $T_H$, the temperature of the layer 2 substantially corresponds to the Curie temperature $T_{C2}$, and magnetization of the layer 2 also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization appear in the layer 2. In this case, magnetization of the model 3 of FIG. 9B is generated by Hb (Condition $5_H$). However, since the temperature is yet higher than the temperature $T_{C1}$, no magnetization appears in the layer 1.

When the temperature of the medium further decreases below the temperature Tcomp.2, the relationship between the strengths of the vectors is reversed (from the model 3 to the model 4) although the directions of the RE and TM spins remain the same. As a result, the direction of magnetization of the alloy as a whole is reversed from "A direction" to the "non-A direction" (Condition $6_H$).

In Condition $6_H$, since the temperature of the medium is higher than the temperature $T_{C1}$, magnetization of the layer 1 has not yet appeared. In addition, since the coersivity $H_{C2}$ at this temperature is high, the direction of magnetization of the layer 2 cannot be reversed by the field Hb.

When the temperature of the medium decreases and is slightly below the temperature $T_{C1}$, magnetization appears in the layer 1. At this time, the exchange coupling force from the layer 2 acts to align each of the RE and TM spins of the layers 1 and 2. Since the temperature of the layer 1 is higher than the temperature Tcomp.1, the TM spin is larger than the RE spin, and hence, magnetization of model 3 appears in the layer 1. This state is Condition $7_H$.

When the temperature of the medium is decreased from the temperature in Condition $7_H$ and is below the temperature Tcomp.1, the relationships between the strengths of the RE and TM spins of the layer 1 is reversed (from the model 3 to the model 4). As a result, magnetization of "non-A direction" appears (Condition $8_H$).

Then, the temperature of the medium decreases from the temperature in Condition $8_H$ to the room temperature. Since the coersivity $H_{C1}$ at the room temperature is sufficiently high, Condition $8_H$ is maintained without reversing the direction of magnetization of the layer 1 by the field Hb. In this way, bit formation in the "non-A direction" is completed.

Next, the low-temperature cycle will be described with reference to FIG. 14.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the recording layer 1, magnetization of the layer 1 disappears (Condition $2_L$).

In Condition $2_L$, when an irradiated portion is separated from the laser beam spot, the medium temperature begins to fall. When the medium temperature is slightly below the temperature $T_{C1}$, the recording layer 1 is influenced by the RE and TM spins (model 1) of the reference layer 2 due to the exchange coupling force. In other words, the exchange coupling force acts to align each of the RE and TM spins of the layers 1 and 2. As a result, magnetization of model 2, without regard to the bias field &Hb, appears in the layer 1 (Condition $3_L$). Since the temperature in Condition $3_L$ is higher than the temperature Tcomp.1, the TM spin is larger than the RE spin.

When the medium temperature is decreased below the temperature Tcomp.1, the relationship between the RE and TM spins of the first layer is reversed (from the model 2 to the model 1) in the same manner as in the high-temperature cycle. As a result, the magnetization of the layer 1 is "A direction" (Condition $4_L$).

Condition $4_L$ is maintained even if the medium temperature is decreased to the room temperature. In this way, mark formation in the "A direction" is completed.

The principle of the method of the present invention will be described in detail using a specific medium No. 2 belonging to Class 2 (P type, Quadrant I, Type 2) shown in Table 1.

The medium No. 2 satisfies Formula 16:

$$T_R < T_{C1} \approx T_L \approx \text{Tcomp.2} < T_{C2} \approx T_H \quad (16)$$

The graph of FIG. 15 shows this relation.

A condition that reverses the direction of magnetization of the layer 2 without reversing that of the layer 1 by the initial field (Hini.) at the room temperature $T_R$ is represented by Formula 17. The medium No. 2 satisfies Formula 17 at the $T_R$:

$$H_{C1} > H_{C2} + (\sigma_w/2M_{S1}t_1) + (\sigma_w/2M_{S2}t_2) \quad (17)$$

where
- $H_{C1}$: coersivity of layer 1
- $H_{C2}$: coersivity of layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 20. If the Hini. disappears, reversed magnetization of the layer 2 is influenced by magnetization of the layer 1 due to an exchange coupling force. The condition that can hold the direction of magnetization of the layer 2 is represented by Formulas 18 and 19. The medium No. 2 satisfies Formulas 18 and 19.

$$H_{C1} > (\sigma_w/2M_{S1}t_1) \quad (18)$$

$$H_{C2} > (\sigma_w/2M_{S2}t_2) \quad (19)$$

$$H_{C2} + (\sigma_w/2M_{S2}t_2) < |H\text{ini.}| < H_{C1} - (\sigma_w/2M_{S1}t_1) \quad (20)$$

The layer 2's magnetization of the recording medium which can satisfy Formulas 17 to 19 at the $T_R$ is aligned along the "A direction" model 1, in FIG. 9B by the Hini. which satisfies Formula 20. At this time, the layer 1 is maintained in the recorded state (Condition 1 in FIGS. 16 and 17).

Condition 1 is held to a point immediately before the recording. In this case, the bias field (Hb) is applied in the upward direction.

The high-temperature cycle will now be described with reference to FIG. 16.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation further continues, the temperature of the medium increases accordingly. When the temperature of the medium slightly exceeds the temperature Tcomp.2 of the layer 2, the relationship between the strengths of the vectors is reversed (from the model 1 to the model 2, in FIG. 9B) although the directions of the RE and TM spins remain the same. For this reason, the direction of magnetization of the layer 2 is reversed to the "non-A direction" (Condition $3_H$).

However, since the coersivity $H_{C2}$ is still high at this temperature, the direction of magnetization of the layer 2 will not be reversed by the field Hb. When the temperature further increases and reaches the temperature $T_H$, the temperature of the layer 2 substantially corresponds to the Curie temperature $T_{C2}$, and magnetization of the layer 2 also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization appears in the layer 2. In this case, magnetization of the model 3 is generated by Hb (Condition $5_H$). However, since the temperature is yet higher than the temperature $T_{C1}$, no magnetization appears in the layer 1.

When the temperature of the medium further decreases below the temperature Tcomp.2, the relationship between the strengths of the vectors is reversed (from the model 3 to the model 4, in FIG. 9B) although the directions of the RE and TM spins remain the same. As a result, the direction of magnetization of the alloy as a whole is reversed from "A direction" to the "non-A direction" (Condition $6_H$).

In Condition $6_H$, since the temperature of the medium is higher than the temperature $T_{C1}$, magnetization of the layer 1 has not yet appeared. In addition, since the coersivity $H_{C2}$ at this temperature is high, the direction of magnetization of the layer 2 cannot be reversed by the field Hb.

When the temperature of the medium decreases and is slightly below the temperature $T_{C1}$, magnetization appears in the layer 1. At this time, the exchange coupling force from the layer 2 acts to align each of the RE and TM spins of the layers 1 and 2. Thus, magnetization of the model 4 appears in the layer 1. This state is Condition $7_H$.

Then, the temperature of the medium decreases from the temperature in Condition $7_H$ to the room temperature. Since the coersivity $H_{C1}$ at the room temperature is sufficiently high, Condition $7_H$ is maintained without reversing the direction of magnetization of the layer 1 by the field Hb. In this way, bit formation in the "non-A direction" is completed.

Next, the low-temperature cycle will be described with reference to FIG. 17.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears (Condition $2_L$).

In Condition $2_L$, when an irradiated portion is separated from the laser beam spot, the medium temperature begins to fall. When the medium temperature is slightly below the temperature $T_{C1}$, the layer 1 is influenced by the RE and TM spins of the layer 2 due to the exchange coupling force. In other words, the exchange coupling force acts to align each of the RE and TM spins of the layers 1 and 2. As a result, magnetization of the model 1 appears in the layer 1 (Condition $3_L$).

Condition $3_L$ is maintained even if the medium temperature is decreased to the room temperature. As a result, a mark in the "A direction" is formed in the layer 1.

The principle of the method of the present invention will be described in detail using a specific medium No. 3 belonging to Class 3 (P type, Quadrant I, Type 3) shown in Table 1.

The medium No. 3 satisfies Formula 21:

$$T_R < T\text{comp.1} < T_{C1} \approx T_L < T_{C2} \approx T_H \quad (21)$$

The graph of FIG. 18 shows this relation.

A condition that reverses the direction of magnetization of the layer 2 without reversing that of the layer 1 by the initial field (Hini.) at the room temperature $T_R$ is represented by Formula 22. The medium No. 3 satisfies Formula 22 at the $T_R$:

$$H_{C1} > H_{C2} + (\sigma_w/2M_{S1}t_1) + (\sigma_w/2M_{S2}t_2) \quad (22)$$

where
- $H_{C1}$: coersivity of layer 1
- $H_{C2}$: coersivity of layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 25. If the Hini. disappears, reversed magnetization of the layer 2 is influenced by magnetization of the layer 1 due to an exchange coupling force. The condition that can hold the direction of magnetization of the layer 2 is represented by Formulas 23 and 24. The medium No. 3 satisfies Formulas 23 and 24.

$$H_{C1} > (\sigma_w/2M_{S1}t_1) \tag{23}$$

$$H_{C2} > (\sigma_w/2M_{S2}t_2) \tag{24}$$

$$H_{C2} + (\sigma_w/2M_{S2}t_2) < |Hini| < H_{C1} - (\sigma_w/2M_{S1}t_1) \tag{25}$$

The layer 2's magnetization of the recording medium which can satisfy Formulas 22 to 24 at the $T_R$ is aligned along the "A direction" (model 1) by the Hini. which satisfies Formula 25. At this time, the layer 1 is maintained in the recorded state (Condition 1 in FIGS. 19 and 20).

Condition 1 is held to a point immediately before the recording. In this case, the bias field (Hb) is applied in the downward direction.

The high-temperature cycle will now be described with reference to FIG. 19.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation further continues, since the temperature $T_H$ of the medium is substantially equal to the temperature $T_{C2}$, magnetization of the layer 2 also disappears (Condition $3_H$).

In Condition $3_H$, when an irradiated portion is separated from the laser beam spot, the temperature of the medium begins to decrease. When the temperature of the medium decreases slightly below the temperature $T_{C2}$, magnetization appears in the layer 2. In this case, magnetization of the model 4 is generated by Hb. However, since the temperature is yet higher than the temperature $T_{C1}$, no magnetization appears in the layer 1. This state is Condition $4_H$.

When the temperature of the medium decreases and is slightly below the temperature $T_{C1}$, magnetization appears in the layer 1. At this time, the exchange coupling force from the layer 2 acts to align each of the RE and TM spins of the layers 1 and 2. Since the temperature of the medium is higher than the temperature Tcomp.1, the TM spin is larger than the RE spin. As a result, magnetization of "A direction" appears in the layer 1 (Condition $5_H$).

When the medium temperature further decreases from the temperature in Condition $5_H$ and is below the temperature Tcomp.1, the relationship between the strengths of the TM and RE spins of the layer 1 is reversed (from the model 3 to the model 4). For this reason, the direction of magnetization of the layer 1 is reversed to the "non-A direction" (Condition $6_H$).

Then, the temperature of the medium decreases from the temperature in Condition $6_H$ to the room temperature. Since the coersivity $H_{C1}$ at the room temperature is sufficiently high, magnetization of the layer 1 is stably maintained. In this way, mark formation in the "non-A direction" is completed.

Next, the low-temperature cycle will be described with reference to FIG. 20.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. However, at this temperature, since the coersivity $H_{C2}$ of the layer 2 is sufficiently high, magnetization of the layer 2 will not be reversed by the bias field Hb (Condition $2_L$).

In Condition $2_L$, when an irradiated portion is separated from the laser beam spot, the medium temperature begins to fall. When the medium temperature is slightly below the temperature $T_{C1}$, the respective spins of the layer 1 are influenced by the RE and TM spins of the layer 2 due to the exchange coupling force. In other words, the exchange coupling force acts to align each of the RE and TM spins of the layers 1 and 2. As a result, magnetization of the model 2 of FIG. 9B, appears in the layer 1. In this case, since the medium temperature is higher than the temperature Tcomp.1, the TM spin is larger than the RE spin (Condition $3_L$).

When the medium temperature is further decreased below the temperature Tcomp.1, the relationship between the strengths of the RE and TM spins of the layer 1 is reversed in the same manner as in the high-temperature cycle (from the model 2 to the model 1). As a result, magnetization of "A direction", without regard to the bias field Hb, appears in the layer 1 (Condition $4_L$).

Condition $4_L$ is maintained even if the medium temperature is decreased to the room temperature. In this way, mark formation in the "A direction" is completed.

The principle of the method of the present invention will be described in detail using a specific medium No. 4 belonging to Class 4 (P type, Quadrant I, Type 4) shown in Table 1.

The medium No. 4 satisfies Formula 26:

$$T_R < T_{C1} \approx T_L < T_{C2} \approx T_H \tag{26}$$

The graph of FIG. 21 shows this relation.

A condition that reverses the direction of magnetization of the layer 2 without reversing that of the layer 1 by the initial field (Hini.) at the room temperature $T_R$ is represented by Formula 27. The medium No. 4 satisfies Formula 27 at the $T_R$:

$$H_{C1} > H_{C2} + (\sigma_w/2M_{S1}t_1) + (\sigma_w/2M_{S2}t_2) \tag{27}$$

where
- $H_{C1}$: coersivity of layer 1
- $H_{C2}$: coersivity of layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall enrgy At this time, a condition for the Hini. is represented by Formula 30. If the Hini. disappears, reversed magnetization of the layer 2 is influenced by magnetization of the layer 1 due to an exchange coupling force. The condition that can hold the direction of magnetization of the layer 2 is represented by Formulas 28 and 29. The medium No. 4 satisfies Formulas 28 and 29.

$$H_{C1} > (\sigma_w/2M_{S1}t_1) \tag{28}$$

$$H_{C2} > (\sigma_w/2M_{S2}t_2) \tag{29}$$

$$H_{C2} + (\sigma_w/2M_{S2}t_2) < |H_{ini.}| < H_{C1} - (\sigma_w/s_1t_1) \tag{30}$$

The layer 2's magnetization of the recording medium which can satisfy Formulas 27 to 29 at the $T_R$ is aligned along the "A direction" (model 1) by the Hini. which satisfies Formula 30. At this time, the layer 1 is maintained in the recorded state (Condition 1 in FIGS. 22 and 23).

Condition 1 is held to a point immediately before the recording. In this case, the bias field (Hb) is applied in the downward direction.

The high-temperature cycle will now be described with reference to FIG. 23.

High-Temperature Cycle

When the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation further continues and the medium temperature is equal to the temperature $T_H$, since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 4 is generated by Hb. However, since the temperature is yet higher than the temperature $T_{C1}$, no magnetization appears in the layer 1. This state is Condition $4_H$.

When the temperature of the medium decreases and is slightly below the temperature $T_{C1}$, magnetization appears in the layer 1. At this time, the exchange coupling force from the layer 2 acts to align each of the RE and TM spins of the layers 1 and 2. As a result, magnetization of the model 4 appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, mark formation in the "non-A direction" is completed.

Next, the low-temperature cycle will be described with reference to FIG. 23.

Low-Temperature Cycle

In Condition 1 immediately before recording, the medium temperature is increased to $T_L$ upon irradiation of the low-level laser beam. Since the temperature $T_L$ exceeds the Curie temperature $T_{C1}$ of the layer 1, magnetization of the layer 1 disappears. However, at this temperature, since the coersivity $H_{C2}$ of the layer 2 is sufficiently high, magnetization of the layer 2 will not be reversed by the bias field Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the recording layer 1 are influenced by the RE and TM spins of the layer 2 due to the exchange coupling force. In other words, the exchange coupling force acts to align each of the RE and TM spins of the layers 1 and 2. As a result, magnetization of the model 1, without regard to the bias field ↓ Hb, appears in the layer 1. This state is Condition $3_L$.

Condition $3_L$ is maintained even if the medium temperature is decreased to the room temperature. In this way, mark formation in the "A direction" is completed.

The principle of the method of the present invention will be described in detail using a specific medium No. 5 belonging to Class 5 (A type, Quadrant II, type 3) shown in Table 1.

The medium No. 5 satisfies Formula 31:

$$T_R < T_{comp.1} < T_{C1} \approx T_L < T_{C2} \approx T_H \tag{31}$$

The graph of FIG. 24 shows this relation.

A condition that reverses the direction of magnetization of the layer 2 without reversing that of the layer 1 by the initial field (Hini.) at the room temperature $T_R$ is represented by Formula 32. The medium No. 6 satisfies Formula 32 at the $T_R$:

$$H_{C1} > H_{C2} + |(\sigma_w/2M_{S1}t_1) - (\sigma_w/2M_{S2}t_2)| \tag{32}$$

where
$H_{C1}$: coersivity of layer 1
$H_{C2}$: coersivity of layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 35. If the Hini. disappears, reversed magnetization of the layer 2 is influenced by magnetization of the layer 1 due to an exchange coupling force. The condition that can hold the direction of magnetization of the layer 2 is represented by Formulas 33 and 34. The medium No. 5 satisfies Formulas 33 and 34.

$$H_{C1} > (\sigma_w/2M_{S1}t_1) \tag{33}$$

$$H_{C2} > (\sigma_w/2M_{S2}t_2) \tag{34}$$

$$H_{C2} + (\sigma_2/2M_{S2}t_2) < |H_{ini.}| < H_{C1} + (\sigma_w/2M_{S1}t_1) \tag{35}$$

The layer 2's magnetization of the recording medium which can satisfy Formulas 32 to 34 at the $T_R$ is aligned along the "A direction" (model 3) by the Hini. which satisfies Formula 35. At this time, the layer 1 is maintained in the recorded state (Condition 1 in FIGS. 25 and 26).

Condition 1 is held to a point immediately before the recording. In this case, the bias field (Hb) is applied in the downward direction.

The high-temperature cycle will now be described with reference to FIG. 25.

(High-Temperature Cycle

When the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation further continues and the medium temperature is equal to the temperature $T_H$, since the temperature T of the layer 2 is substantially equal to the Curie temperature $T_{C2}$, magnetization of the layer 2 also disappears (Condition $3_H$).

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 2 is generated by Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 acts to align each of the RE and TM spins of the layers 1 and 2. In this case, since the medium temperature is yet higher than the temperature Tcomp.1, the TM spin is larger than the RE spin. As a result, magnetization of "non-A direction" appears in the layer 2 (Condition $5_H$).

When the medium temperature is decreased below the temperature Tcomp.1 from the temperature in Condition $5_H$, the relationship between the strengths of the TM and RE spins of the layer 1 is reversed (from the model 2 to the model 1). For this reason, magnetization of the layer 1 is reversed to the "A-direction" (Condition $6_H$).

Then, the temperature of the medium decreases from the temperature in Condition $6_H$ to the room temperature. Since the coersivity $H_{C1}$ at the room temperature is sufficiently high, magnetization of the layer 1 is stably maintained. In this way, mark formation in the "A direction" is completed.

Next, the low-temperature cycle will be described with reference to FIG. 26.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. However, at this temperature, since the coersivity $H_{C2}$ of the layer 2 is sufficiently high, magnetization of the layer 2 will not be reversed by the bias field Hb (Condition $2_L$).

When the beam radiation is completed in Condition $2_L$, the medium temperature begins to fall. When the medium temperature is slightly below the temperature $T_{C1}$, the respective spins of the recording layer 1 are influenced by the RE and TM spins of the layer 2 due to the exchange coupling force. In other words, the exchange coupling force acts to align each of the RE and TM spins of the layers 1 and 2. As a result, magnetization of the model 3, without regard to bias field Hb, appears in the layer 1. In this case, since the medium temperature is higher than the temperature Tcomp.1, the TM spin is larger than the RE spin (Condition $3_L$).

When the medium temperature is decreased below the temperature Tcomp.1, the relationship between the strengths of the RE and TM spins of the layer 1 is reversed as well as the high-temperature cycle (from the model 3 to the model 4). As a result, the magnetization of the layer 1 is "non-A direction" (Condition $4_L$).

Condition $4_L$ is maintained even if the medium temperature is decreased to the room temperature. In this way, mark formation in the "non-A direction" is completed.

The principle of the method of the present invention will be described in detail using a specific medium No. 6 belonging to Class 6 (A type, Quadrant II, Type 4) shown in Table 1.

The medium No. 6 satisfies Formula 36:

$$T_R < T_{C1} \approx T_L < T_{C2} \approx T_H \tag{36}$$

The graph of FIG. 27 shows this relation.

A condition that reverses the direction of magnetization of the layer 2 without reversing that of the layer 1 by the initial field (Hini.) at the room temperature $T_R$ is represented by Formula 37. The medium No. 6 satisfies Formula 37 at the $T_R$:

$$H_{C1} > H_{C2} + |(\sigma_w/2M_{S1}t_1) - (\sigma_2/2M_{S2}t_2)| \tag{37}$$

where
$H_{C1}$: coersivity of layer 1
$H_{C2}$: coersivity of layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 40. If the Hini. disappears, reversed magnetization of the layer 2 is influenced by magnetization of the layer 1 due to an exchange coupling force. The condition that can hold the direction of magnetization of the layer 2 is represented by Formulas 38 and 39. The medium No. 6 satisfies Formulas 38 and 39.

$$H_{C1} > (\sigma_w/2M_{S1}t_1) \tag{38}$$

$$H_{C2} > (\sigma_w/2M_{S2}t_2) \tag{39}$$

$$H_{C2} + (\sigma_w/2M_{S2}t_2) < |\text{Hini.}| < H_{C1} + (\sigma_w/2M_{S1}t_1) \tag{40}$$

The layer 2's magnetization of the recording medium which can satisfy Formulas 37 to 39 at the $T_R$ is aligned along the "A direction" (model 3) by the Hini. which satisfies Formula 40. At this time, the layer 1 is maintained in the recorded state (Condition 1 in FIGS. 28 and 29).

Condition 1 is held to a point immediately-before the recording. In this case, the bias field (Hb) is applied in the downward direction.

The high-temperature cycle will now be described with reference to FIG. 28.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$)

When the laser-beam radiation further continues and the medium temperature is equal to the temperature $T_H$, since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 2 is generated by Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 acts to align each of the RE and TM spins of the layers 1 and 2. For this reason, magnetization of the model 1, without regard to the bias field Hb, appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "A direction" is completed.

Next, the low-temperature cycle will be described with reference to FIG. 29.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. In this state, however, since the coersivity $H_{C2}$ of the layer 2 is sufficiently high, magnetization of "A direction" of the layer 2 will not be reversed by the bias field Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the layer 1 are influenced by the RE and TM spins of the layer 2 due to the exchange coupling force. In other words, the exchange coupling force acts to align each of the RE and TM spins of the layers 1 and 2. As a result, magnetization of the model 4, appears in the layer 1. This state is Condition $3_L$.

Condition $3_L$ is maintained even if the medium temperature is decreased to the room temperature. In this way, mark formation in the "non-A direction" is completed.

The principle of the method of the present invention will be described in detail using a specific medium No. 7 belonging to Class 7 (P type, Quadrant III, Type 4) shown in Table 1.

The medium No. 7 satisfies Formula 41:

$$T_R < T_{C1} \approx T_L < T_{C2} \approx T_H \quad (41)$$

The graph of FIG. 30 shows this relation.

A condition that reverses the direction of magnetization of the layer 2 without reversing that of the layer 1 by the initial field (Hini.) at the room temperature $T_R$ is represented by Formula 42. The medium No. 7 satisfies Formula 42 at the $T_R$:

$$H_{C1} > H_{C2} + (\sigma_w/2M_{S1}t_1) + (\sigma_2/2M_{S2}t_2) \quad (42)$$

where
$H_{C1}$: coersivity of layer 1
$H_{C2}$: coersivity of layer 2
$M_{S1}$: saturation magnetization of layer 1
$M_{S2}$: saturation magnetization of layer 2
$t_1$: film thickness of layer 1
$t_2$: film thickness of layer 2
$\sigma_w$: interface wall energy At this time, a condition for the Hini. is represented by Formula 45. If the Hini. disappears, reversed magnetization of the layer 2 is influenced by magnetization of the layer 1 due to an exchange coupling force. The condition that can hold the direction of magnetization of the layer 2 is represented by Formulas 43 and 44. The medium No. 7 satisfies Formulas 43 and 44.

$$H_{C1} > (\sigma_w/2M_{S1}t_1) \quad (43)$$

$$H_{C2} > (\sigma_w/2M_{S2}t_2) \quad (44)$$

$$H_{C2} + (\sigma_2/2M_{S2}t_2) < |Hini.| < H_{C1} - (\sigma_w/2M_{S1}t_1) \quad (45)$$

The layer 2's magnetication of the recording medium which can satisfy Formulas 42 to 44 at the $T_R$ is alinged along the "A direction" (model 3) by the Hini. which satisfies Formula 45. At this time, the recording layer 1 is maintained in the recorded state (Condition 1 in FIGS. 31 and 32).

Condition 1 is held to a point immediately before the recording. In this case, the base field (Hb) is applied in the downward direction.

The high-temperature cycle will now be described with reference to FIG. 31.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation continues and the medium temperature is equal to the temperature $T_H$. since the temperature $T_H$ of the layer 2 is substantially equal to the Curie temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 2 is generated by Hb. However, since the temperature is yet higher than the temperature $T_{C1}$, no magnetization appears in the layer 1. This state is Condition $4_H$.

When the temperature of the medium is further decreased slightly below the temperature $T_{C1}$, magnetization appears in the layer 1. At this time, the exchange coupling force from the layer 2 acts to align each of the RE and TM spins of the layers 1 and 2. For this reason, magnetization of the model 2 appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, bit formation in the "non-A direction" is completed.

Next, the low-temperature cycle will be described with reference to FIG. 32.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. In this state, however, since the coersivity $H_{C2}$ of the layer 2 is sufficiently high, magnetization of "A direction" of the layer 2 will not be reversed by the bias field Hb. This state is Condition $2_L$.

In Condition $2_L$, when an irradiated portion is separated from the laser beam spot, the medium temperature begins to fall. When the medium temperature is slightly below the temperature $T_{C1}$, the respective spins of the layer 1 are influenced by the RE and TM spins of the layer 2 due to the exchange coupling force. In other words, the exchange coupling force acts to align each of the RE and TM spins of the layers 1 and 2. As a result, magnetization of the model 3, without regard to the bias field Hb, appears in the layer 1. This state is Condition $3_L$.

Condition $3_L$ is maintained even if the medium temperature is decreased to the room temperature. In this way, mark formation in the "A direction" is completed.

The principle of the method of the present invention will be described in detail using a specific medium No. 8 belonging to Class 8 (A type, Quadrant IV, Type 2) shown in Table 1.

The medium No. 8 satisfies Formula 46:

$$T_R < T_{C1} \approx T_L \approx Tcomp.2 < T_{C2} \approx T_H \qquad (46)$$

The graph of FIG. 33 shows this relation.

A condition that reverses the direction of magnetization of the layer 2 without reversing that of the layer 1 by the initial field (Hini.) at the room temperature $T_R$ is represented by Formula 47. The medium No. 8 satisfies Formula 47 at the $T_R$:

$$H_{C1} > H_{C2} |(\sigma_w/2M_{S1}t_1) - (\sigma_w/2M_{S2}t_2)| \qquad (47)$$

where
 $H_{C1}$: coersivity of layer 1
 $H_{C2}$: coersivity of layer 2
 $M_{S1}$: saturation magnetization of layer 1
 $M_{S2}$: saturation magnetization of layer 2
 $t_1$: film thickness of layer 1
 $t_2$: film thickness of layer 2
 $\sigma_w$: interface wall energy At this time, a condition for the Hini. is represented by Formula 50. If the Hini. disappears, reversed magnetization of the layer 2 is influenced by magnetization of the layer 1 due to an exchange coupling force. The condition that can hold the direction of magnetization of the layer 2 is represented by Formulas 48 and 49. The medium No. 8 satisfies Formulas 48 and 49.

$$H_{C1} > (\sigma_w/2M_{S1}t_1) \qquad (48)$$

$$H_{C2} > (\sigma_w/2M_{S2}t_2) \qquad (49)$$

$$H_{C2} + (\sigma_w/2M_{S2}t_2) < |Hini.| < H_{C1} + (\sigma_w/2M_{S1}t_1) \qquad (50)$$

The layer 2's magnetization of the recording medium which can satisfy Formulas 47 to 49 at the $T_R$ is aligned along the "A direction" (model 1) by the Hini. Which satisfies Formula 50. At this time the layer 1 is maintained in the recorded state (Condition 1 in FIGS. 34 and 35).

Condition 1 is held to a point immediately before the recording. In this case, the bias field (Hb) is applied in the upward direction.

The high-temperature cycle will now be described with reference to FIG. 34.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation continues and the medium temperature is slightly higher than the temperature Tcomp.2, the relationship between, the strengths of the RE and TM spins is reversed (from the model 1 to the model 2) although the directions thereof remain the same. As a result, the direction of the magnetization of the layer 2 is reversed to "non-A direction" This state is Condition $3_H$.

At this temperature, however, since the coersivity $H_{C2}$ is yet high, magnetization of "non-A direction" of the layer 2 will not be reversed by the bias field Hb. Assume that the laser-beam radiation further continues and the medium temperature is increased to $T_H$. Since the temperature $T_H$ is substantially equal to the temperature $T_{C2}$, magnetization of the layer 2 also disappears (Condition $4_H$).

In Condition $4_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 3 is generated by Hb. However, since the temperature is yet higher than the temperature $T_{C1}$, no magnetization appears in the layer 1. This state is Condition $5_H$.

When the temperature of the medium is further decreased slightly below the temperature Tcomp. 1, the relationship between the strengths of the RE and TM spins is reversed (from the model 3 to the model 4) without reversing the directions thereof. As a result, the direction of magnetization of the layer 2 is reversed to "non-A direction". In this state, since the coersivity $H_{C2}$ is already sufficiently high, magnetization of "non-A direction" of the layer 2 will not be reversed by the bias field Hb. In this case, since the medium temperature is yet higher than the temperature $T_{C1}$, no magnetization appears in the layer 1. This state is Condition $6_H$.

When the medium temperature further decreases slightly below the temperature $T_{C1}$, magnetization also appears in the layer 1. At this time, magnetization (model 4) of the layer 1 influences the layer 1 due to the exchange coupling force to align each of the RE and TM spins of the layers 1 and 2. For this reason, magnetization of the model 3 appears in the layer 1 (Condition $7_H$).

Then, the temperature of the medium decreases from the temperature in Condition $7_H$ to the room temperature. Since the coersivity $H_{C1}$ at the room temperature is sufficiently high, magnetization of the layer 1 is stably maintained. In this way, mark formation in the "A direction" is completed.

Next, the low-temperature cycle will be described with reference to FIG. 35.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. In this state, however, since the coersivity $H_{C2}$ of the layer 2 is sufficiently high, magnetization of the layer 2 will not be reversed by the bias field Hb (Condition $2_L$).

In Condition $2_L$, when an irradiated portion is separated from the laser beam spot, the medium temperature begins to fall. When the medium temperature begins to fall. When the medium temperature is slightly below the temperature $T_{C1}$, the respective spins of the layer 1 are influenced by the RE and TM spins of the layer 2 due to the exchange coupling force. In other words, the exchange coupling force acts to align each of the RE and TM spins of the layers 1 and 2. As a result, magnetization of the model 2, without regard to the bias field Hb, appears in the layer 1. This state is Condition $3_L$.

Condition $3_L$ is maintained even if the medium temperature is decreased to the room temperature. In this way, mark formation in the "non-A direction" is completed.

The principle of the method of the present invention will be descirbed in detail using a specific medium No. 9 belonging to Class 9 (A type, Quadrant IV, Type 4) shown in Table 1.

The medium No. 9 satisfies Formula 51:

$$T_R < T_{C1} \approx T_L < T_{C2} \approx T_H \qquad (51)$$

The graph of FIG. 36 shows this relation.

A condition that reverses the direction of magnetization of the layer 2 without reversing that of the layer 1 by the initial field (Hini.) at the room temperature $T_R$ is represented by Formula 52.

The medium No. 9 satisfies Formula 52 at the $T_R$:

$$H_{C1} > H_{C2} + |(\sigma_w/2M_{S1}t_1) - (\sigma_w/2M_{S2}t_2)| \qquad (52)$$

where
- $H_{C1}$: coersivity of layer 1
- $H_{C2}$: coersivity of layer 2
- $M_{S1}$: saturation magnetization of layer 1
- $M_{S2}$: saturation magnetization of layer 2
- $t_1$: film thickness of layer 1
- $t_2$: film thickness of layer 2
- $\sigma_w$: interface wall energy At this time, a condition for the Hini. is represented by Formula 50. If the Hini. disappears, reversed magnetization of the layer 2 is influenced by magnetization of the layer 1 due to an exchange coupling force. The condition that can hold the direction of magnetization of the layer 2 is represented by Formulas 53 and 54. The medium No. 9 satisfies Formulas 53 and 54.

$$H_{C1} > (\sigma_w/2M_{S1}t_1) \qquad (53)$$

$$H_{C2} > (\sigma_w/2M_{S2}t_2) \qquad (54)$$

$$H_{C2} + (\sigma_w/2Mt_2) < |Hini.| < H_{C1} + (\sigma_w/2M_{S1}t_1) \qquad (55)$$

The layer 2's magnetization of the recording medium which can satisfy Formulas 52 to 54 at the $T_R$ is aligned along the "A direction" (model 1) by the Hini. which satisfies Formula 55. At this time, the layer 1 is maintained in the recorded state (Condition 1 in FIGS. 37 and 38).

Condition 1 is held to a point immediately before the recording. In this case, the bias field (Hb) is applied in the downward direction.

The high-temperature cycle will now be described with reference to FIG. 37.

High-Temperature Cycle

In Condition 1, when the medium temperature is increased to $T_L$ upon irradiation of the high-level laser beam, since the temperature $T_L$ is substantially equal to the Curie temperature $T_{C1}$ of the layer 1, magnetization of the layer 1 disappears (Condition $2_H$).

When the laser-beam radiation continues and the medium temperature is equal to the temperature $T_H$, the temperature $T_H$ is substantially equal to the temperature $T_{C2}$, magnetization of the layer 2 also disappears. This state is Condition $3_H$.

In Condition $3_H$, when an irradiated portion is separated from the laser beam spot, the temperature of the medium begins to decrease. When the temperature of the medium decreases slightly below the temperature $T_{C2}$, magnetization of the layer 2 appears. In this case, magnetization of the model 4 is generated by Hb. However, since the temperature is yet higher than the temperature $T_{C1}$, no magnetization appears in the layer 1. This state is Condition $4_H$.

When the temperature of the medium is further decreased slightly below the temperature $T_{C1}$. magnetization appears in the layer 1. At this time, the exchange coupling force from the layer 2 (model 4) acts to align each of the RE and TM spins of the layers 1 and 2. For this reason, magnetization of the model 3, without regard to the bias field Hb, appears in the layer 1. This state is Condition $5_H$.

Then, the temperature of the medium decreases from the temperature in Condition $5_H$ to the room temperature. Since the coersivity $H_{C1}$ at the room temperature is sufficiently high, magnetization of the layer 1 is stably maintained. In this way, mark formation in the "A direction" is completed.

Next, the low-temperature cycle will be described with reference to FIG. 38.

Low-Temperature Cycle

In Condition 1 immediately before recording, the medium temperature is increased to $T_L$ upon irradiation of the low-level laser beam. Since the temperature $T_L$ is substantially equal to the Curie temperature $T_{C1}$ of the layer 1, magnetization of the layer 1 disappears. In this state, however, since the coersivity $H_{C2}$ of the layer 2 is sufficiently high, magnetization of "A direction" of the layer 2 will not be reversed by the bias field Hb. This state is Condition $2_L$.

In Condition $2_L$, when an irradiated portion is separated from the laser beam spot, the medium temperature begins to fall. When the medium temperature is slightly below the temperature $T_{C1}$, the recording layer 1 is influenced by the RE and TM spins of the layer 2 due to the exchange coupling force. In other words, the exchange coupling force acts to align each of the RE and TM spins of the layers 1 and 2. As a result, magnetization of the model 2, appears in the layer 1. This state is Condition $3_L$.

Condition $3_L$ is maintained even if the medium temperature is decreased to the room temperature. In this way, mark formation in the "non-A direction" is completed.

Problem to be Solved by the Invention

In order to prolong the service life of a magnetic layer, film formation must be performed in high vacuum.

However, according to experiments of the present inventors, when first and second layers are consecutively formed in high vacuum although the formation order is not limited, an exchange coupling force $\sigma_w$ between the magnetic layers may become too large depending on material compositions to be used.

An over write capable medium must satisfy the following relation so that information in the first layer is not erased by the magnetization of the initialized second layer:

$$H_{C1} > \frac{\sigma_w}{2M_{S1}t_1}$$

In addition, the medium must also satisfy the following relation so that the magnetization of the initialized second layer is not reversed by the magnetization of the first layer:

$$H_{C2} > \frac{\sigma_w}{2M_{S2}t_2}$$

Therefore, when the exchange coupling force $\sigma_w$ is too large, since a coercivity $H_C$ and a saturated magnetic moment $M_s$ are determined by the material of the magnetic layer, the film thickness t must be increased.

However, when the total film thickness $t_{12}$ of the first and second layers is increased, the heat capacity of the magnetic layers is increased. Thus, when a laser beam is radiated in a recording mode to increase the medium temperature to $T_H$ or $T_L$, a laser beam power must be increased, resulting in poor radiation efficiency.

When the film thickness of the first layer is decreased too much (e.g., 400 Å or less), if information is reproduced therefrom, a Kerr rotation angle $\theta k$ is decreased, and hence, a C/N ratio is decreased.

In contrast to this, such a limitation is not imposed on the second layer, and the thickness of the second layer should be decreased as much as possible. For example, the thickness of the second layer can be about 100 Å.

SUMMARY OF THE INVENTION

It is therefore an object of the present invention to provide an over write capable magnetooptical recording medium having a large exchange coupling force $\sigma_w$, which can decrease a total film thickness $t_{12}$ of first and second layers, and can suppress a decrease in C/N ratio.

In order to suppress a decrease in C/N ratio, the present inventors have made studies to attain a decrease in film thickness of the second layer while the film thickness of the first layer remains the same, or so as to exceed an increase in film thickness of the first layer even if the thickness of the first layer is increased.

The above-mentioned relations are modified to obtain the following two relations:

$$1 > \frac{\sigma_w}{H_{C1}2M_{S1}t_1}$$

-continued $$1 > \frac{\sigma_w}{H_{C2}2M_{S2}t_2}$$

From these relations, in order to decrease the film thickness of the second layer, only the exchange coupling force $\sigma_w$ can be decreased while the $H_CM_S$ product of the second layer is left unchanged. Thus, a non-magnetic element such as Si, Ge, or the like is doped in the first layer, thereby decreasing the exchange coupling force $\sigma_w$.

It was found that, however, the total film thickness $t_{12}$ could not be decreased according to the object.

The present invention made further studies, and found that when the non-magnetic element was doped, the exchange coupling force $\sigma_w$ was decreased, and at the same time, the $H_CM_S$ product of the first layer was also decreased.

For this reason, in a medium having a smaller $H_CM_S$ product of the first layer than that of the second layer, when the non-magnetic element is doped in the first layer to decrease the exchange coupling force $\sigma_w$, the $H_CM_S$ product is further decreased. Therefore, the film thickness $t_1$ of the first layer must be considerably increased. As a result, it was also found that when the film thickness $t_2$ of the second layer was decreased, the total film thickness $t_{12}$ was consequently increased.

In contrast to this, it was found that in a medium having a larger $H_CM_S$ product $H_{C1}M_{S1}$ of the first layer than the product $H_{C2}M_{S2}$ of the second layer, since the $H_CM_S$ product of the first layer was originally large, even if this product was decreased, the film thickness $t_1$ was increased only slightly, and the film thickness $t_2$ of the second layer could be decreased to exceed an increase in thickness $t_1$, so that the total film thickness $t_{12}$ could be consequently decreased, thus achieving the present invention.

More specifically, according to the characteristic feature of the present invention, a medium having a larger $H_CM_S$ product $H_{C1}M_{S1}$ of the first layer than a $H_CM_S$ product $H_{C2}M_{S2}$ of the second layer is selected, so that the exchange coupling force $\sigma_w$ is decreased by doping a non-magnetic element in the first layer to decrease the film thickness $t_2$ of the second layer, and the total film thickness $t_{12}$ is consequently decreased.

A magnetic moment of a magnetic body is defined by an orbital angular momentum and a spin angular momentum of an outer shell electron of an atom, and its exchange interaction is performed by the electron and an electron adjacent thereto according to the Pauli principle and an electrostatic interaction between the two electrons. For this reason, when a distance between magnetic atoms is increased or the number of most adjacent magnetic atoms is decreased, a degree of overlapping of wave functions of electrons of the atom is decreased, resulting in a decrease in exchange interaction.

When a non-magnetic element is doped in a magnetic layer according to the present invention, a distance between magnetic atoms in layers can be essentially increased, and the number of most adjacent magnetic atoms is decreased. Thus, the exchange interaction is decreased to decrease the exchange coupling force $\sigma_w$.

Non-magnetic elements to be used include, e.g., Si, Ge, Ti, Cr, Cu, In, and the like.

A doping amount of the non-magnetic element is preferably at least 0.5 atm% to obtain the above effect.

However, an actual doping amount should be obtained by preliminary experiments in accordance with a predetermined exchange coupling force $\sigma_w$ and an $H_C M_S$ product at that time. In this case, the doping amount is at most 10 atm%, and is generally smaller than 5 atm%.

BRIEF DESCRIPTION OF THE DRAWINGS

FIG. 3 is a timing chart showing a laser beam intensity;

FIG. 4A is a diagram of a multilayered structure of a recording medium;

FIG. 4B is a diagram showing the direction of magnetization of a recording layer and a reference layer;

FIG. 8 illustrates flows of the changes in the direction of magnetization shown in FIGS. 5 and 6 for respective P- and A-type media;

FIGS. 13 and 14 are diagrams showing changes in the direction of magnetization in high- and low-temperature cycles of a medium No. 1;

FIGS. 16 and 17 are diagrams showing the changes in the direction of magnetization in high- and low-temperature cycles of a medium No. 2;

FIGS. 22 and 23 are diagrams showing the changes in the direction of magnetization in high- and low-temperature cycles of the medium No. 4;

FIGS. 28 and 29 are diagrams showing the changes in the direction of magnetization in high- and low-temperature cycles of the medium No. 6;

FIGS. 34 and 35 are diagrams showing the changes in the direction of magnetization in high- and low-temperature cycles of the medium No. 8;

FIGS. 37 and 38 are diagrams showing the changes in the direction of magnetization in high- and low-temperature cycles of the medium No. 9;

The present invention will be described in detail below by way of its embodiments and reference embodiments. However, the present invention is not limited to these embodiments.

Embodiment

A three-element RF magnetron sputtering apparatus was used, and a disk-like glass substrate having a thickness of 1.2 mm and a diameter of 200 mm was set in a vacuum chamber of the apparatus.

The interior of the vacuum chamber was temporarily evacuated to $5 \times 10^{-5}$ Pa. Thereafter, argon (Ar) gas was introduced into the chamber, and sputtering was performed at a film formation rate of about 3 Å/sec while maintaining the Ar gas pressure to be $2 \times 10^{-1}$ Pa.

Sputtering was performed using two targets, i.e., a TbFeCo alloy and Ti (non-magnetic element) to form a first layer comprising a TbFeCoTi perpendicular magnetic film having a film thickness $t_1 = 500$ Å on the substrate.

Then, sputtering was performed using a TbDyFeCo alloy as a target while maintaining the vacuum state to form a second layer comprising a TbDyFeCo perpendicular magnetic film having a film thickness $t_2 = 700$ Å on the first layer.

In this manner, several types of two-layered magnetooptical recording media (FIG. 4A) were prepared by changing an electric power to be applied to a Ti target to change an amount of Ti to be doped in the first layer.

The product $H_{C1}M_{S1}$ and the exchange coupling force $\sigma_w$ of the first layer and the product $H_{C2}M_{S2}$ of the second layer of each of the prepared several types of media were measured.

As a result, when no element was doped, the $H_C M_S$ product of the first layer was 600,000, and that of the second layer was 200,000. In this case, the $H_C M_S$ product of the first layer is larger than that of the second layer.

Figure 1:
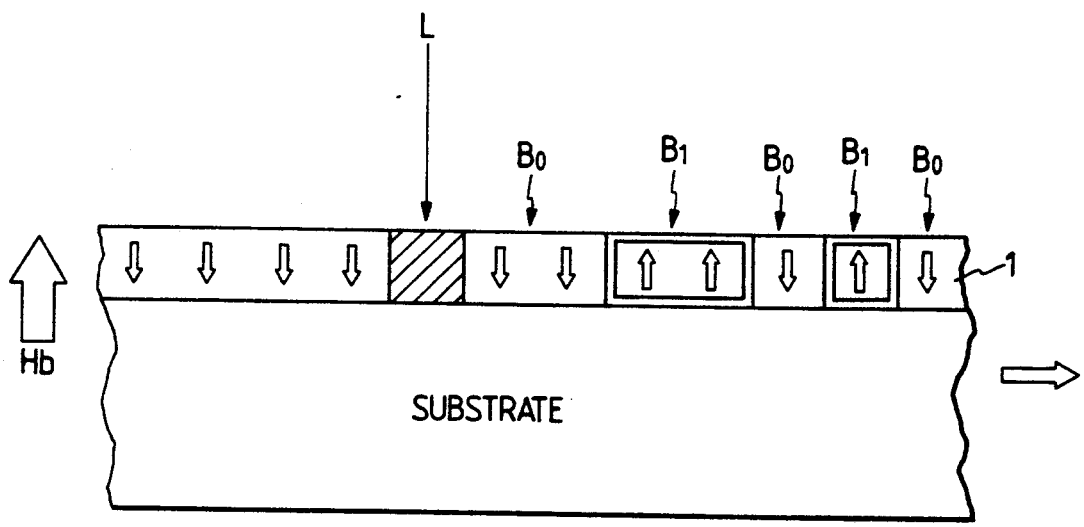
FIG. 1 is an illustration for explaining a recording principle of a magnetooptical recording method.
Figure 2:
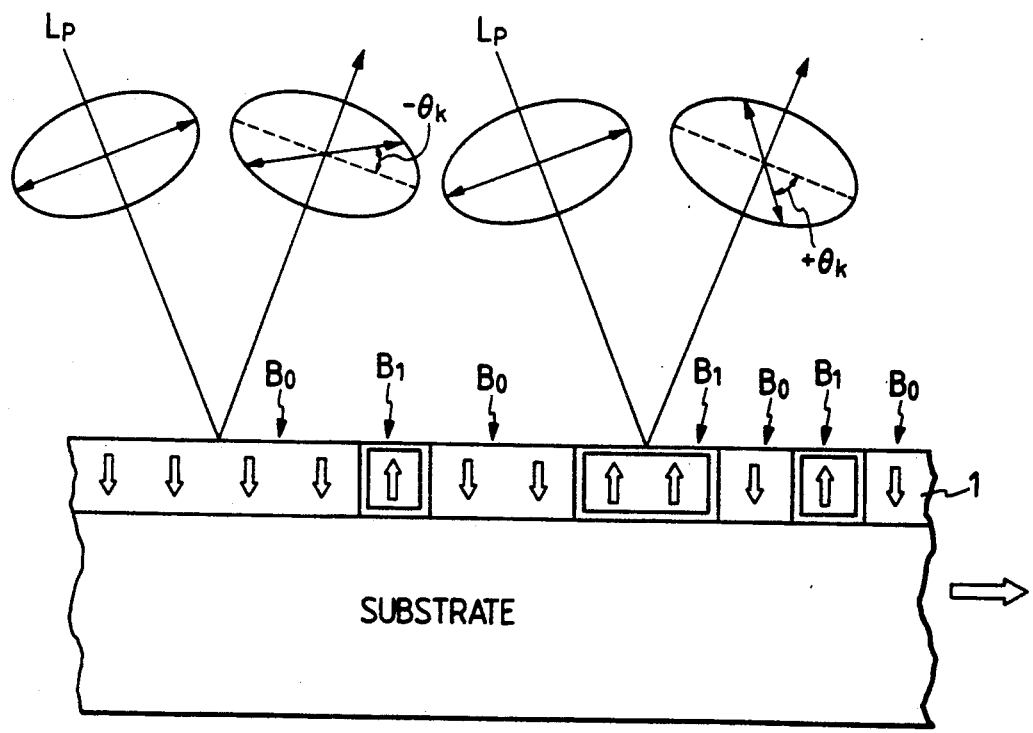
FIG. 2 is an illustration for explaining a reading principle of the magnetooptical recording method.
Figure 5:
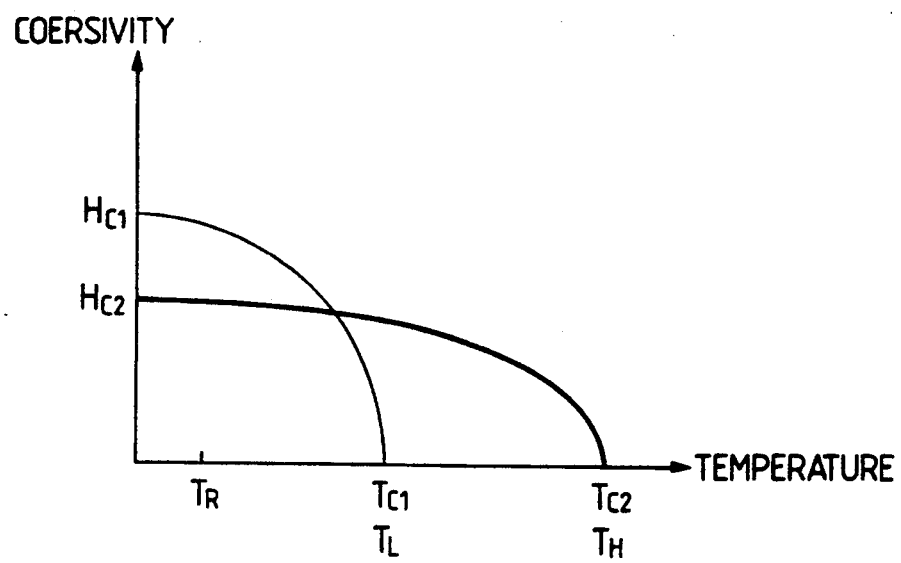
FIG. 5 is a graph showing the relationship between coersivity and temperature.
Figure 6:
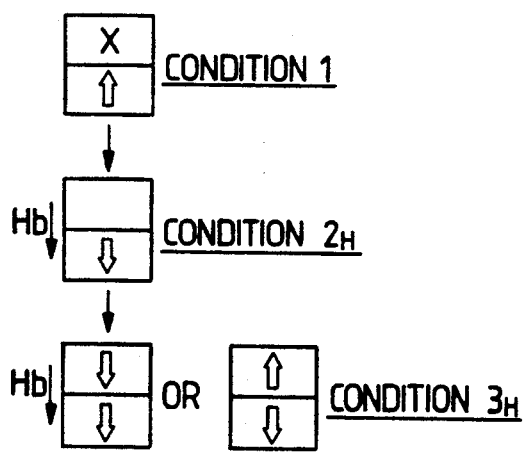
FIG. 6 illustrates changes in the direction of magnetization at high level.
Figure 7:
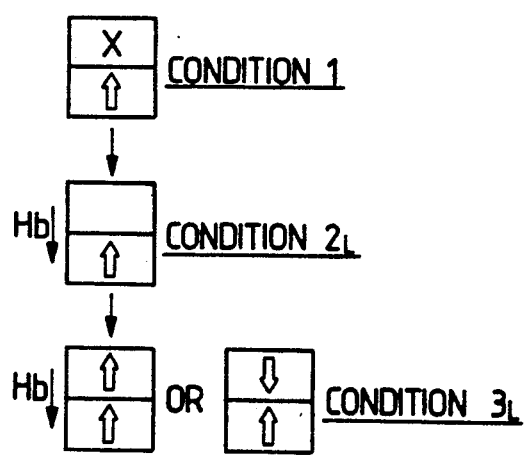
FIG. 7 illustrates changes in the direction of magnetization at low level.
Figure 9:
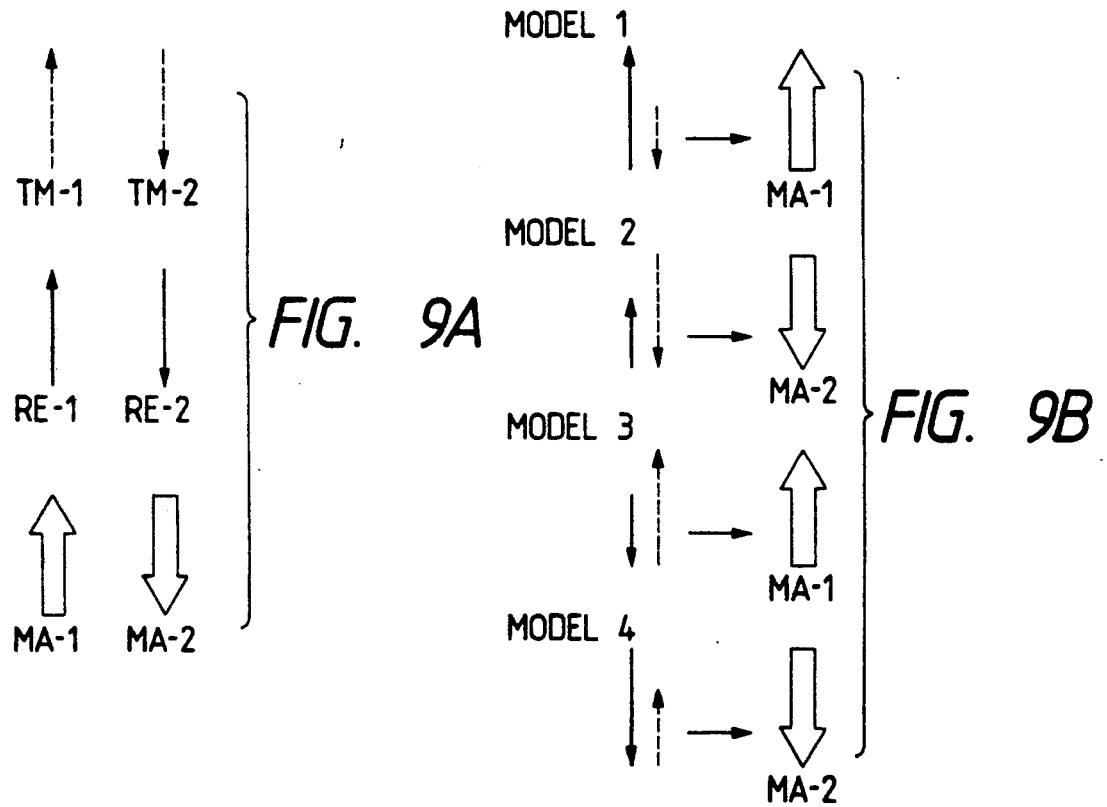
FIG. 9A and 9B are views for explaining various magnetic fields.
Figure 10:
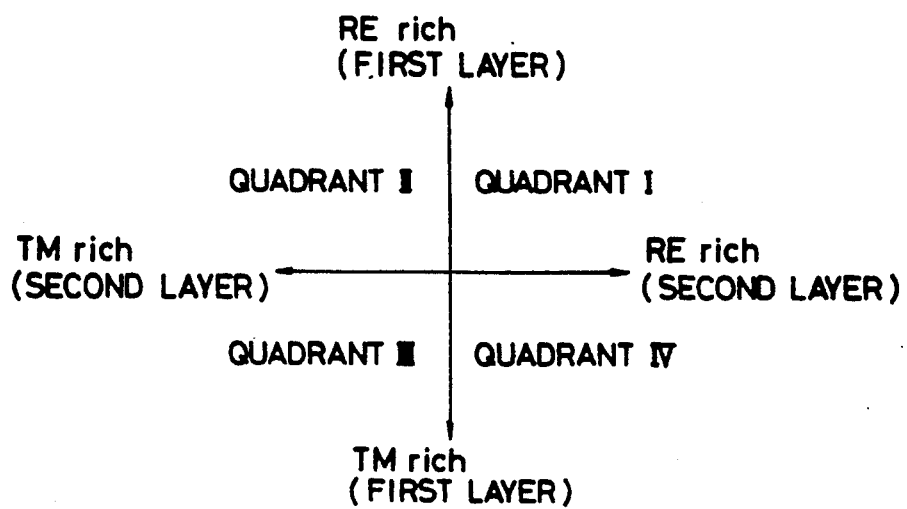
FIG. 10 is a map wherein the types of media of the present invention as classified into four quadrants.
Figure 12:
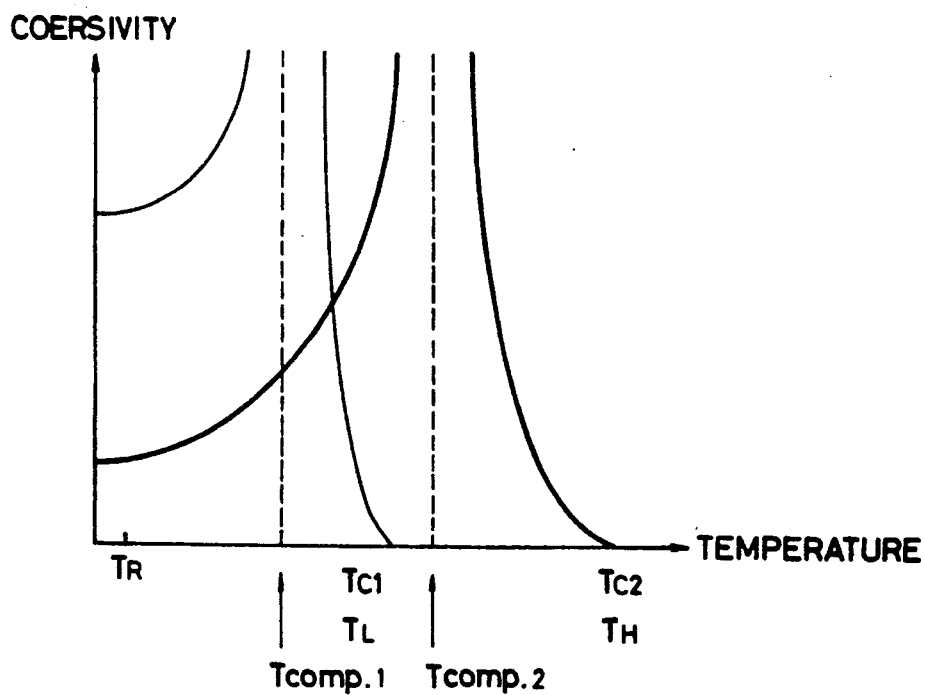
FIG. 12 is a graph showing the relationship between the coersivity and the temperature for a medium No. 1.
Figure 11A:
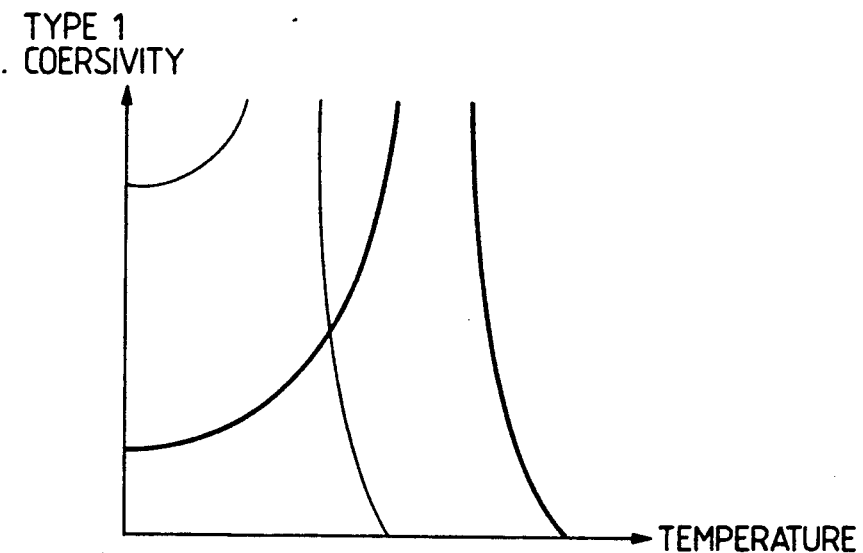
FIGS. 11A to 11D are graphs showing the relationship between the coersivity and the temperature respectively for media of Types I to IV.
Figure 11B:
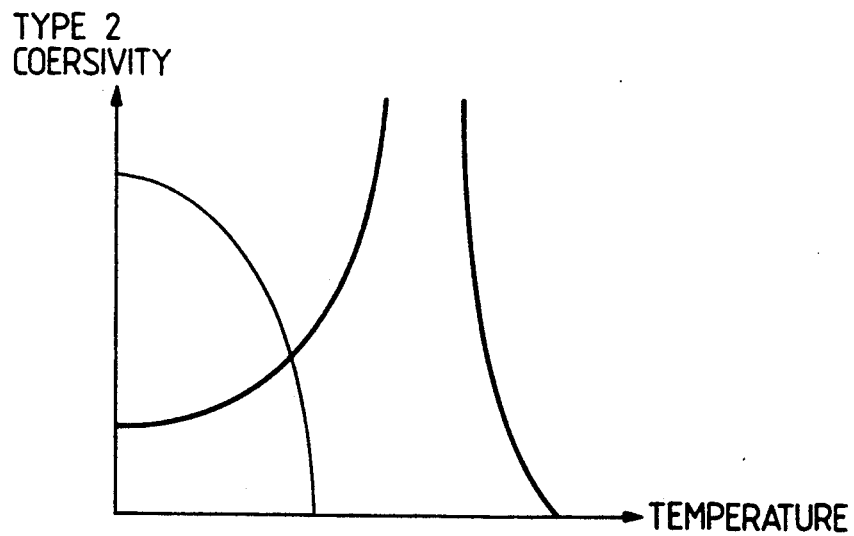
Figure 11C:
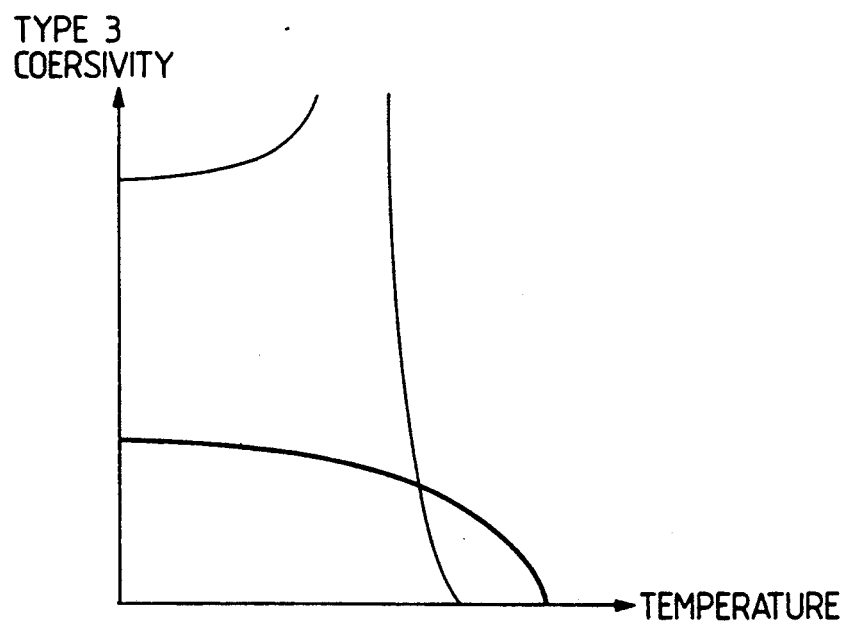
Figure 11D:
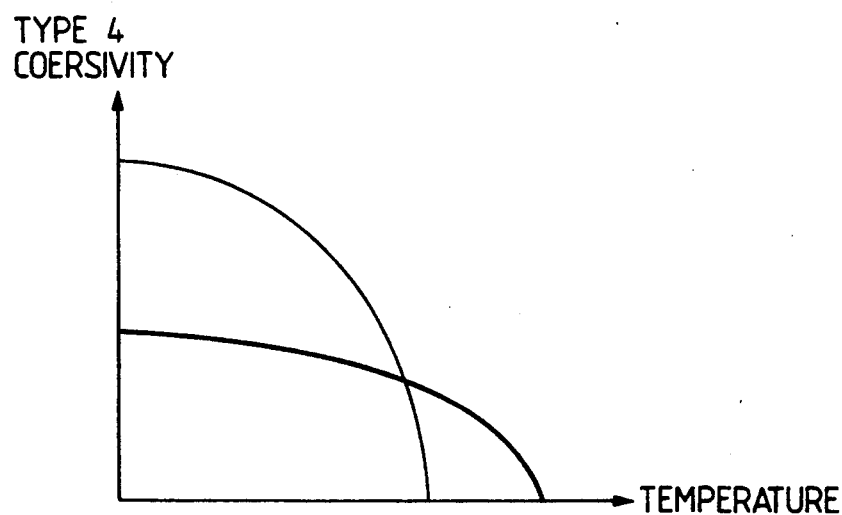
Figure 15:
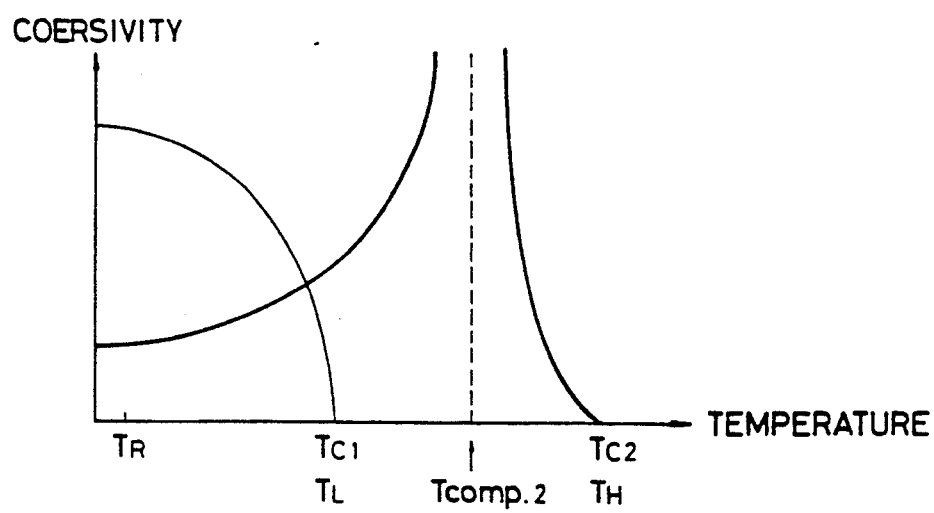
FIG. 15 is a graph showing the relationship between the coersivity and the temperature for the medium No. 2.
Figure 18:
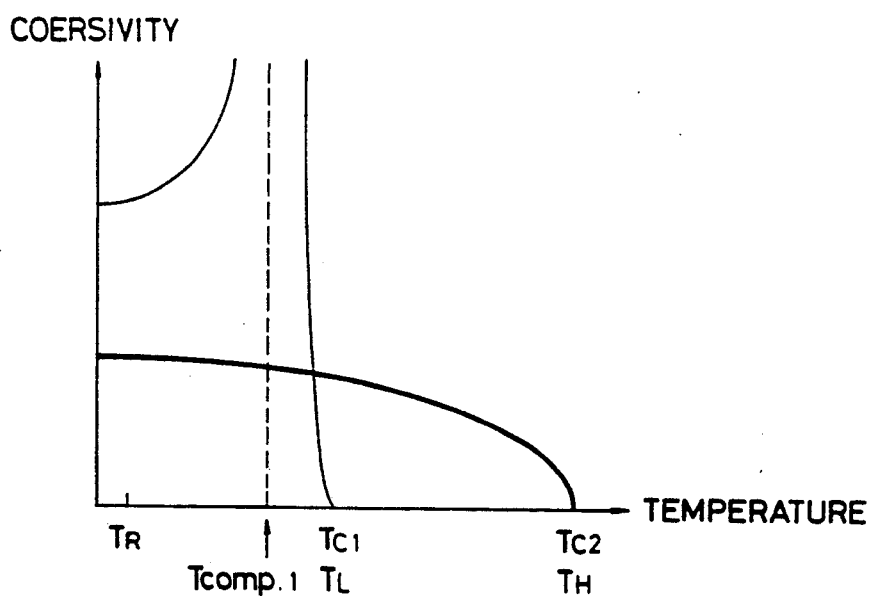
FIG. 18 is a graph showing the relationship between the coersivity and the temperature for a medium No. 3.
Figure 19:
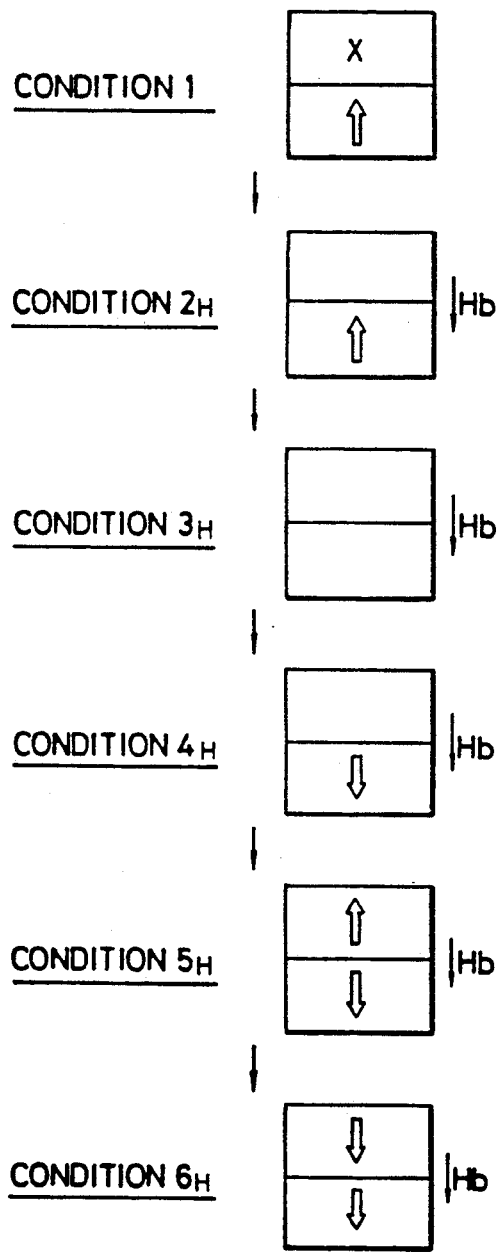
FIGS. 19 and 20 are diagrams showing the changes in the direction of magnetization in high- and low-temperature cycles of the medium No. 3.
Figure 20:
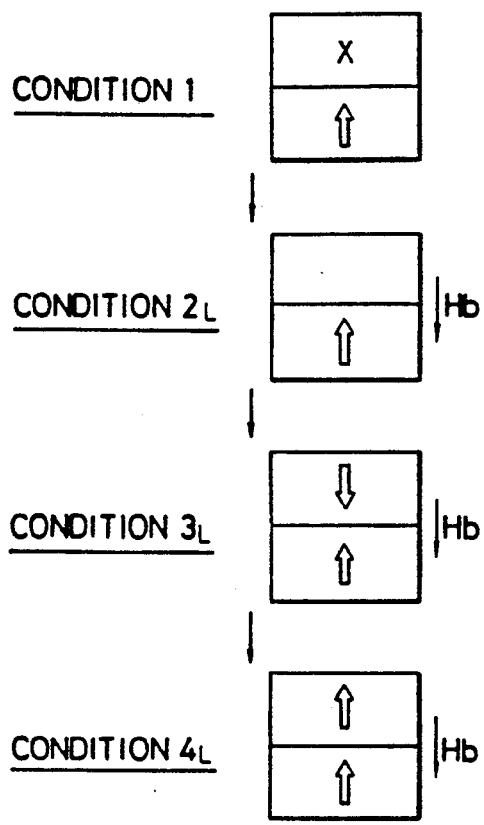
Figure 21:
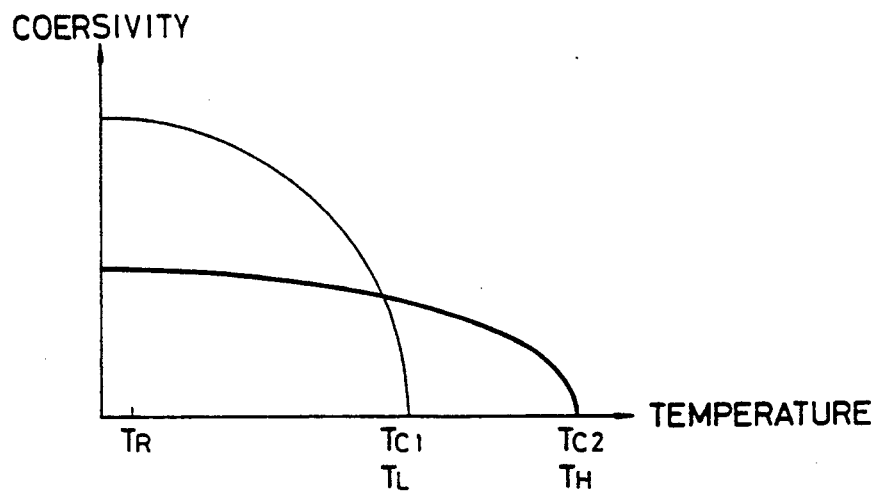
FIG. 21 is a graph showing the relationship between the coersivity and the temperature for a medium No. 4.
Figure 24:
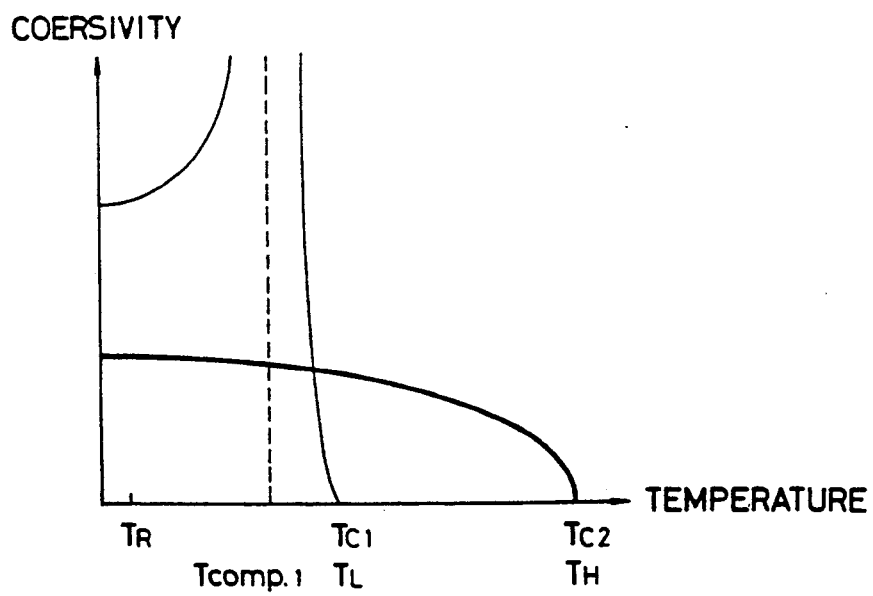
FIG. 24 is a graph showing the relationship between the coersivity and the temperature for a medium No. 5.
Figure 25:
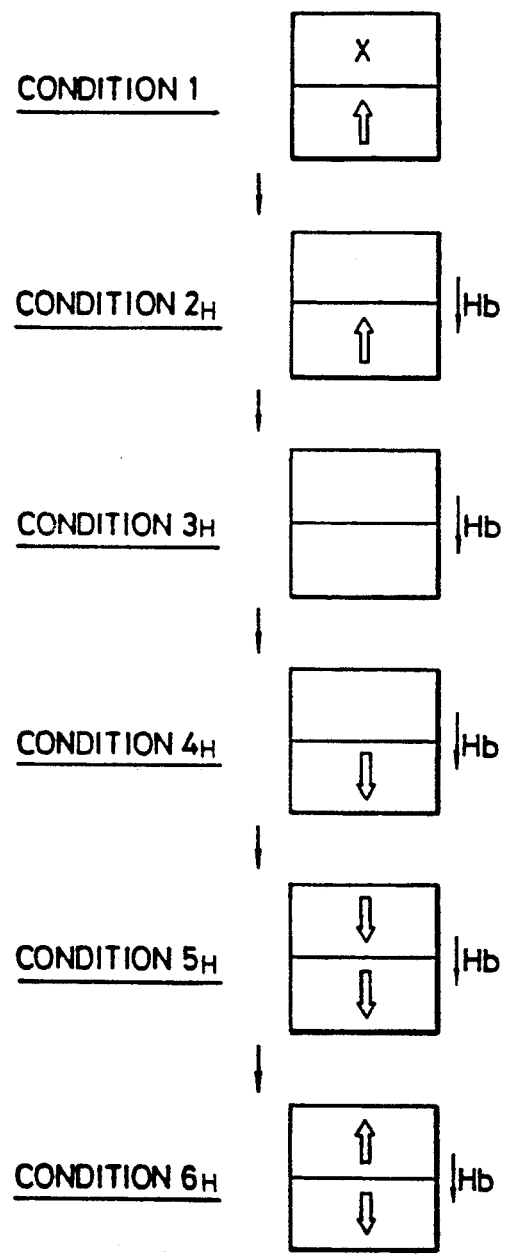
FIGS. 25 and 26 are diagrams showing the changes in the direction of magnetization in high- and low-temperature cycles of the medium No. 5.
Figure 26:
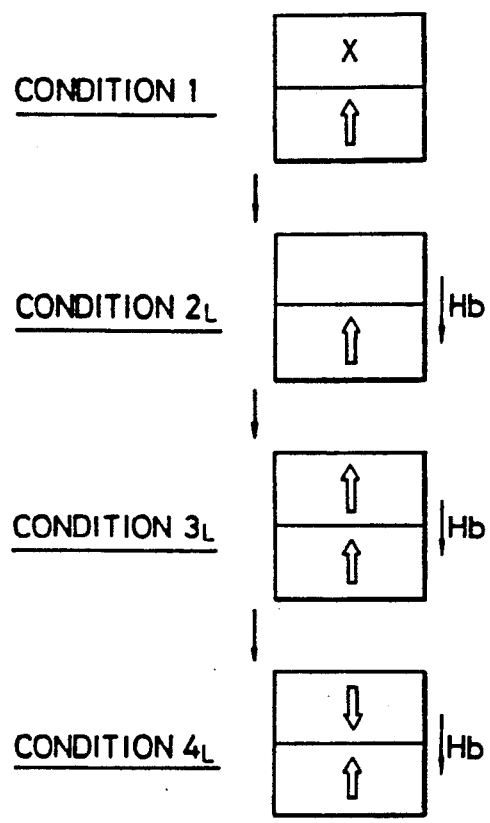
Figure 27:
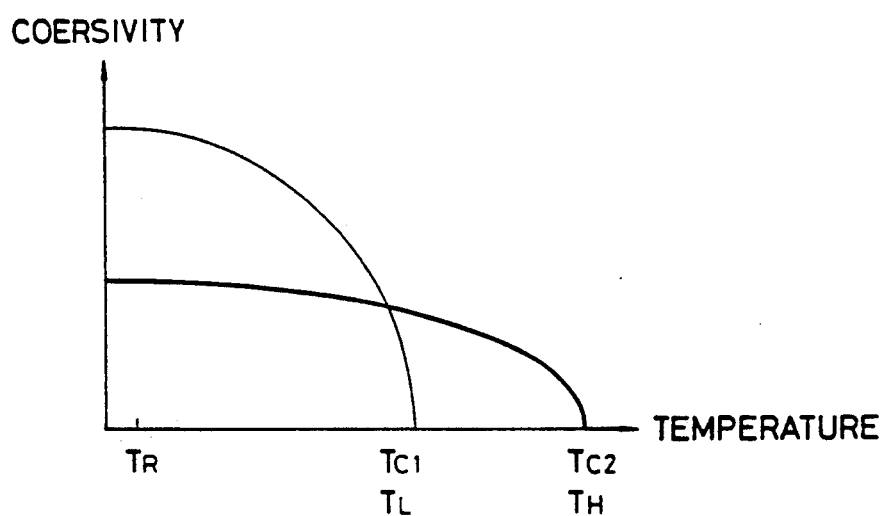
FIG. 27 is a graph showing the relationship between the coersivity and the temperature for a medium No. 6.
Figure 30:
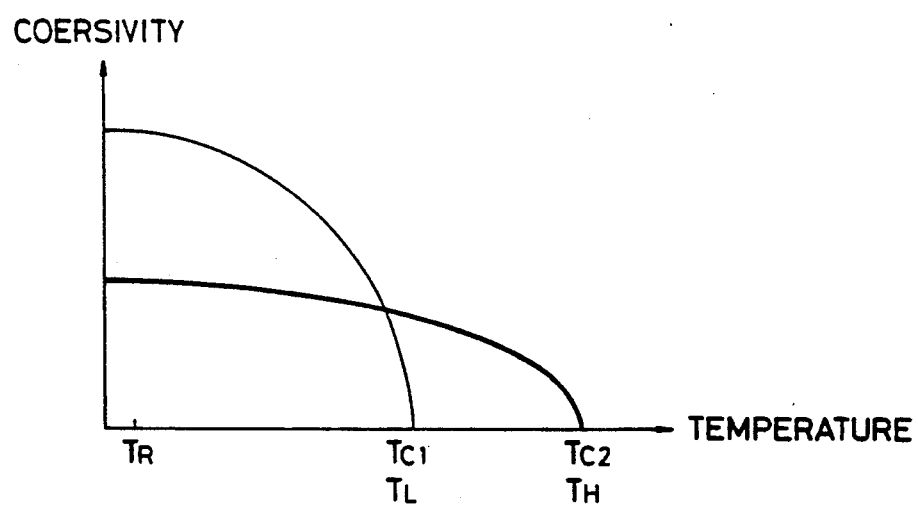
FIG. 30 is a graph showing the relationship between the coersivity and the temperature for a medium No. 7.
Figure 31:
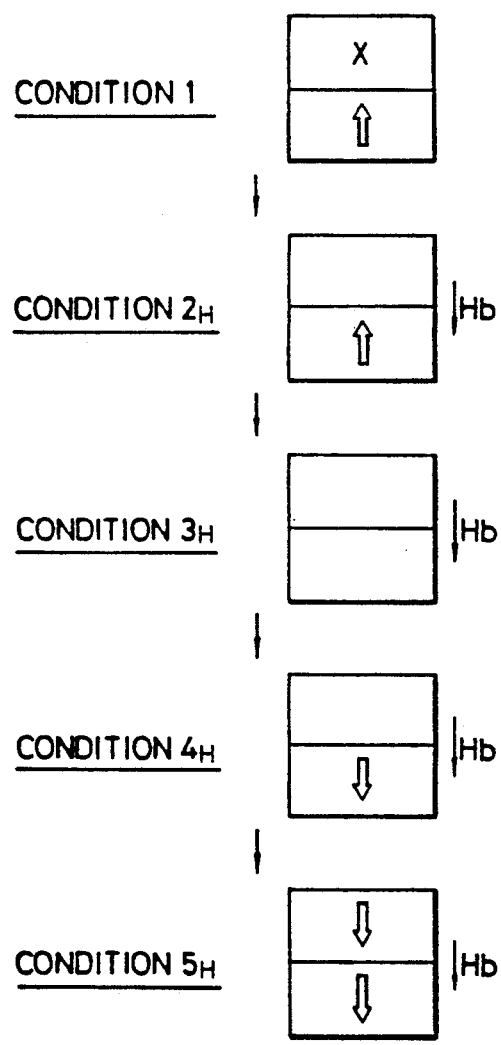
FIGS. 31 and 32 are diagrams showing the changes in the direction of magnetization in high- and low-temperature cycles of the medium No. 7.
Figure 32:
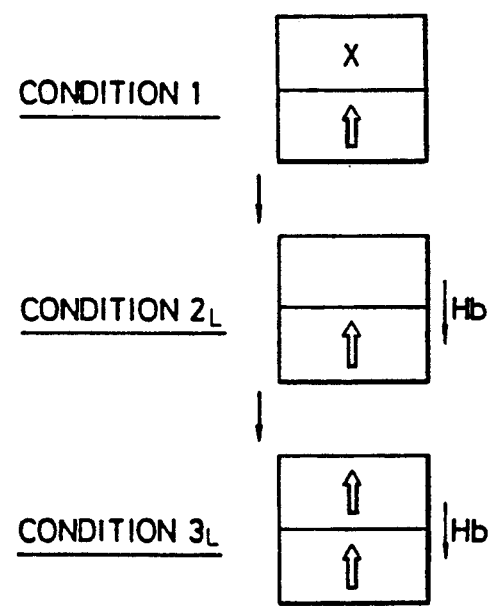
Figure 33:
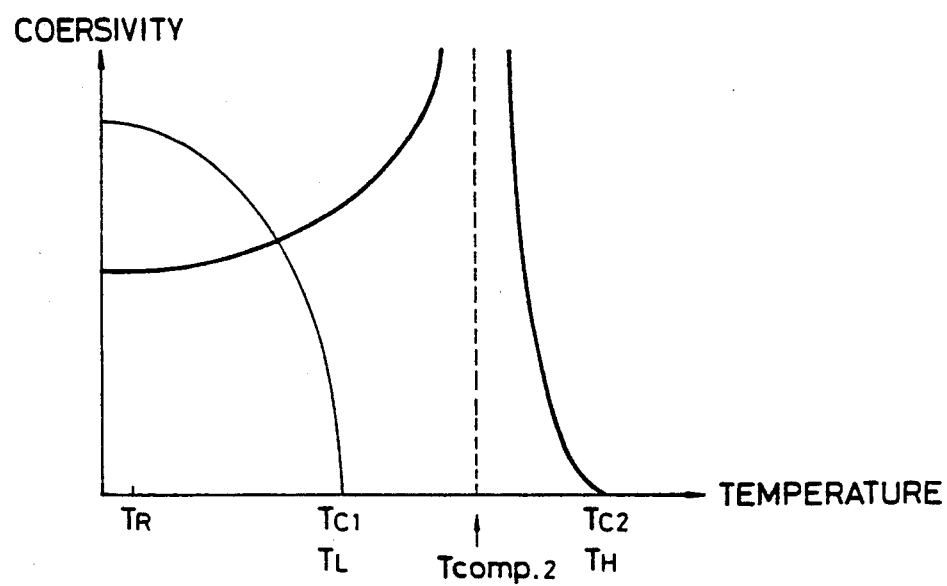
FIG. 33 is a graph showing the relationship between the coersivity and the temperature for a medium No. 8.
Figure 36:
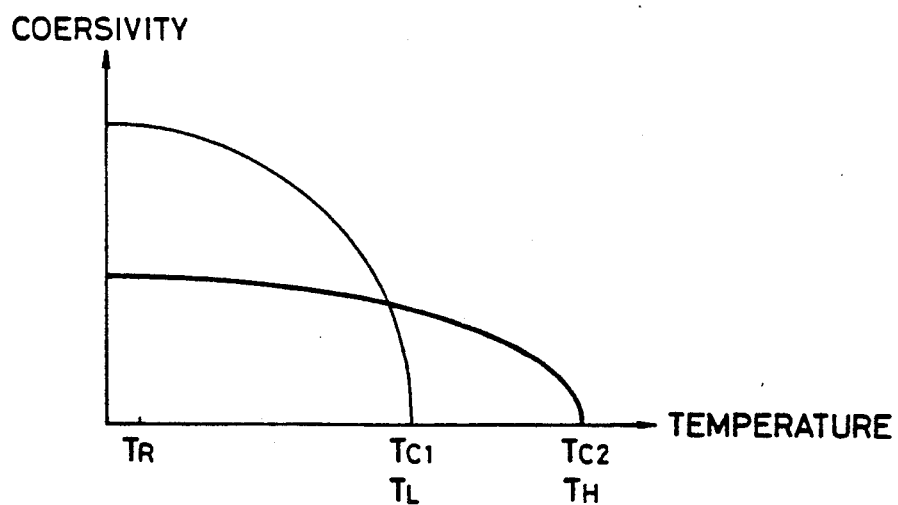
FIG. 36 is a graph showing the relationship between the coersivity and the temperature for a medium No. 9.
Figure 39:
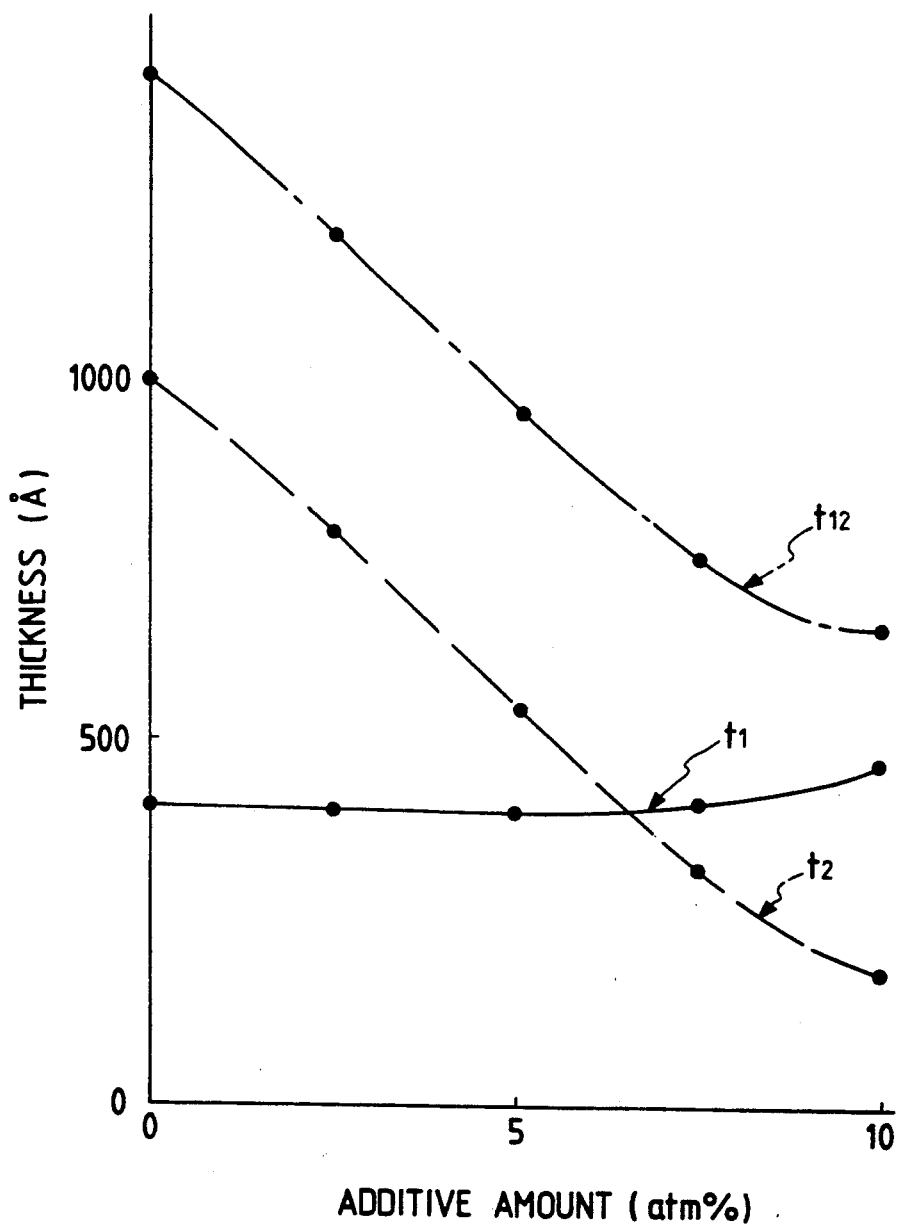
FIG. 39 is a graph showing the relationship between the thickness of layers and amount of addition of non-magnetic material according to an embodiment of the present invention.

Minimum values of film thicknesses $t_1$ and $t_2$ of the first and second layers were calculated from conditions 3A and 4A based on the measured exchange coupling forces $\sigma_w$ and the $H_C M_S$ products. FIG. 39 is a graph showing the calculation results. FIG. 39 also shows a change in minimum total film thickness $t_{12}$ by an alternate long and a short dashed line on the basis of the graph of the film thicknesses $t_1$ and $t_2$.

As can be seen from this graph, if the doping amount of the nonmagnetic element Ti is increased, the total film thickness $t_{12}$ can be decreased.

Comparative Embodiment

An over write capable two-layered magnetooptical recording medium consisting of a first layer comprising a GdDyFeCoTi perpendicular magnetic film having a film thickness $t_1 = 500$ Å and a second layer comprising a TbDyFeCo perpendicular magnetic film having a film thickness $t_2 = 700$ Å was prepared following the same procedures as in Embodiment described above.

In this case, several types of media having various amounts of Ti to be doped in the first layer were prepared by changing an electric power to be applied to a Ti target following the same procedures as in Example described above. For the prepared several types of media, the $H_C M_S$ products and the exchange coupling forces $\sigma_w$ of the first and second layers were measured.

As a result, when no element was doped, the $H_C M_S$ product of the first layer was 150,000, and that of the second layer was 200,000. In this case, the $H_C M_S$ product of the first layer is smaller than that of the second layer.

Figure 40:
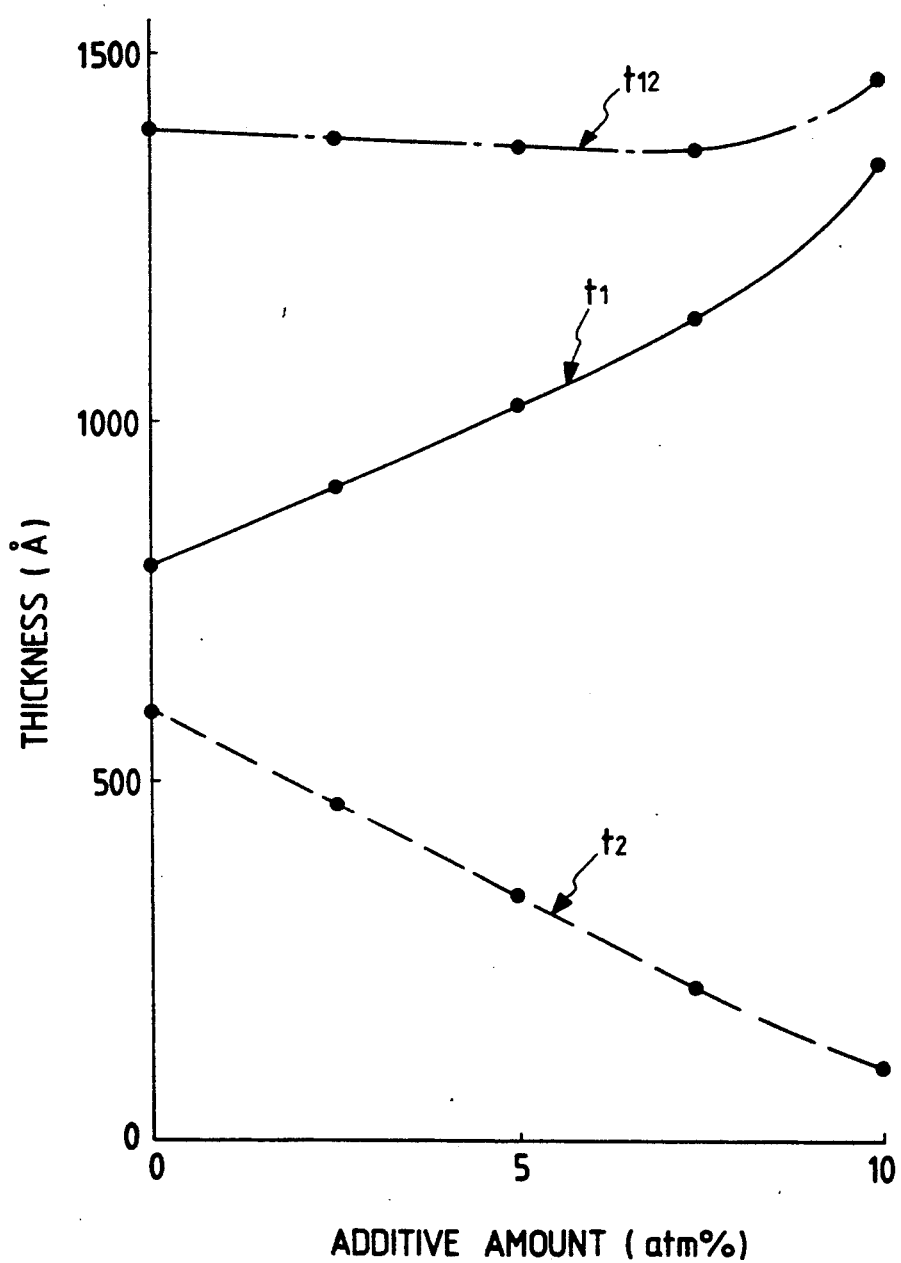
FIG. 40 is a graph showing the relationship between the thickness of layers and amount of addition of non-magnetic material according to a comparative example.

Minimum values of film thicknesses $t_1$ and $t_2$ of the first and second layers were calculated from conditions 3A and 4A based on the measured exchange coupling forces $\sigma_w$ and the $H_C M_S$ products. FIG. 40 is a graph showing the calculation results. FIG. 40 also shows a change in minimum total film thickness $t_{12}$ by an alternate long and a short dashed line on the basis of the graph of the film thicknesses $t_1$ and $t_2$.

As can be seen from this graph, if the doping amount of the nonmagnetic element Ti is increased, the total film thickness $t_{12}$ cannot be so decreased as compared to Embodiment described above.

As described above, according to the present invention, a medium having a larger $H_C M_S$ product of the first layer than that of the second layer is selected, and a non-magnetic element is doped in the first layer to decrease the exchange coupling force $\sigma_w$. Thus, the total film thickness $t_{12}$ can be decreased without decreasing the film thickness $t_1$ of the first layer, i.e., decreasing the C/N ratio.

What is claimed is:

1. An over write capable magnetooptical recording medium comprising:
    a substrate; and
    magnetooptical layers including first and second layers each having a perpendicular magnetic anisotropy,
    wherein a product of a saturated magnetic moment and a coercivity of said first layer is larger than that of said second layer, and a non-magnetic element effective to decrease an exchange coupling force between the first and second layers is doped in said first layer only, and in an amount in the range of 0.5 to 10 atm%.

2. A medium according to claim 1, wherein the nonmagnetic element is an element selected from the group consisting of Si, Ge, Ti, Cr, Cu, and In.

3. A medium according to claim 1, wherein when one of upward and downward directions with respect to said medium is represented by an "A direction" and the other is represented by a "non-A direction",
    only a magnetization of said second layer is aligned in the "A direction" by an initial field Hini. immediately before recording,
    when a high-level laser beam is radiated, the "A-directed" magnetization of said second layer is reversed to the "non-A direction" by a bias field, and a mark having a "non-A-directed" or "A-directed" magnetization is formed in said first layer by the "non-A directed" magnetization of said second layer, and
    when a low-level laser beam is radiated, a mark having an "A-directed" or "non-A-directed" magnetization is formed in said first layer by the "A-directed" magnetization of said second layer.

4. A medium according to claim 4, wherein said first layer comprises a magnetic thin film having a high coercivity and a low Curie temperature at a room temperature, and said second layer comprises a magnetic thin film having a relatively low coercivity and a relatively high Curie temperature at a room temperature.

5. A medium according to claim 3, wherein when a temperature at which said first layer is magnetically coupled to said second layer is represented by $T_{S1}$ and a temperature at which said second layer is reversed by the bias field is represented by $T_{S2}$, said first layer has a high coercivity at a room temperature, said second layer has a relatively low coercivity at a room temperature, and $T_{S1} < T_{S2}$ is satisfied.

6. A medium according to claim 1, wherein each of said first and second layers is selected from a transition metal-rare earth alloy composition.

7. A medium according to claim 6, wherein said first layer consists of a rare earth rich transition metal-rare earth alloy having a compensation temperature between a room temperature and a Curie temperature, said second layer consists of a rare earth rich transition metal-rare earth alloy having a compensation temperature between the room temperature and the Curie temperature, said medium satisfies the following condition:

$$T_R < T_{comp.1} < T_{C1} \approx T_L \approx T_{comp.2} < T_{C2} \approx T_H \quad (1)$$

and, said medium satisfies the following conditions at the room temperature:

$$H_{C1} > H_{C2} + \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < Hini. < H_{C1} - \frac{\sigma_w}{2M_{S1}t_1} \quad (5)$$

where
$T_R$: room temperature
$T_{comp.1}$: compensation temperature of first layer
$T_{comp.2}$: compensation temperature of second layer
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer $t_1$: film thickness of first layer
$T_2$: film thickness of second layer
$\sigma_w$: exchange coupling force
Hini.: initial field 8. A medium according to claim 6, wherein said first layer consists of a rare earth rich transition metal-rare earth alloy having no compensation temperature between a room temperature and a Curie temperature, said second layer consists of a rare earth rich transition metal-rare earth alloy having a compensation temperature between the room temperature and the Curie temperature, said medium satisfies the following condition:

$$T_R < T_{C1} \approx T_L \approx T_{comp.2} < T_{C2} \approx T_H \quad (2)$$

and, said medium satisfies the following conditions at the room temperature:

$$H_{C1} > H_{C2} + \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < \text{Hini.} < H_{C1} - \frac{\sigma_w}{2M_{S1}t_1} \quad (5)$$

where
$T_R$: room temperature
$T_{comp.2}$: compensation temperature of second layer
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer
$t_1$: film thickness of first layer
$t_2$: film thickness of second layer
$\sigma_w$: exchange coupling force
Hini.: initial field 9. A medium according to claim 6, wherein said first layer consists of a rare earth rich transition metal-rare earth alloy having a compensation temperature between a room temperature and a Curie temperature, said second layer consists of a rare earth rich transition metal-rare earth alloy having no compensation temperature between the room temperature and the Curie temperature, said medium satisfies the following condition:

$$T_R < T_{comp.1} < T_{C1} \approx T_L < T_{C2} \approx T_H \quad (1)$$

and, said medium satisfies the following conditions at the room temperature:

$$H_{C1} > H_{C2} + \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < \text{Hini.} < H_{C1} - \frac{\sigma_w}{2M_{S1}t_1} \quad (5)$$

where
$T_R$: room temperature
$T_{comp.1}$: compensation temperature of first layer
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer
$t_1$: film thickness of first layer
$t_2$: film thickness of second layer
$\sigma_w$: exchange coupling force
Hini.: initial field 10. A medium according to claim 6, wherein said first layer consists of a rare earth rich transition metal-rare earth alloy having no compensation temperature between a room temperature and a Curie temperature, said second layer consists of a rare earth rich transition metal-rare earth alloy having no compensation temperature between the room temperature and the Curie temperature, said medium satisfies the following condition:

$$T_R < T_{C1} \approx T_L < T_{C2} < T_H \quad (1)$$

and, said medium satisfies the following conditions at the room temperature:

$$H_{C1} > H_{C2} + \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < \text{Hini.} < H_{C1} - \frac{\sigma_w}{2M_{S1}t_1} \quad (5)$$

where
$T_R$: room temperature
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer
$t_1$: film thickness of first layer
$t_2$: film thickness of second layer
$\sigma_w$: exchange coupling force
Hini. initial field 11. A medium according to claim 6, wherein said first layer consists of a rare earth rich transition metal-rare, earth alloy having a compensation temperature between a room temperature and a Curie temperature, said second layer consists of a transition metal rich transition metal-rare earth alloy having no compensation temperature between the room temperature and the Curie temperature, said medium satisfies the following condition:

$$T_R < T_{comp.1} < T_{C1} \approx T_L < T_{C2} \approx T_H \quad (1)$$

and, said medium satisfies the following conditions at the room temperature:

$$H_{C1} > H_{C2} + \left| \frac{\sigma_w}{2M_{S1}t_1} - \frac{\sigma_w}{2M_{S2}t_2} \right| \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < Hini. < H_{C1} - \frac{\sigma_w}{2M_{S1}t_1} \quad (5)$$

where
- $T_R$: room temperature
- $T_{comp.1}$: compensation temperature of first layer
- $T_{C1}$: Curie temperature of first layer
- $T_{C2}$: Curie temperature of second layer
- $T_L$: temperature of recording medium when low-level laser beam is radiated
- $T_H$: temperature of recording medium when high-level laser beam is radiated
- $H_{C1}$: coercivity of first layer
- $H_{C2}$: coercivity of second layer
- $M_{S1}$: saturated magnetic moment of first layer
- $M_{S2}$: saturated magnetic moment of second layer
- $t_1$: film thickness of first layer
- $t_2$: film thickness of second layer
- $\sigma_w$: exchange coupling force
- Hini.: initial field 12. A medium according to claim 6, wherein said first layer consists of a rare earth rich transition metal-rare earth alloy having no compensation temperature between a room temperature and a Curie temperature, said second layer consists of a transition metal rich transition metal-rare earth alloy having no compensation temperature between the room temperature and the Curie temperature, said medium satisfies the following condition:

$$T_R < T_{C1} \approx T_L < T_{C2} \approx T_H \quad (1)$$

and, said medium satisfies the following conditions at the room temperature:

$$H_{C1} > H_{C2} + \left| \frac{\sigma_w}{2M_{S1}t_1} - \frac{\sigma_w}{2M_{S2}t_2} \right| \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < Hini. < H_{C1} - \frac{\sigma_w}{2M_{S1}t_1} \quad (5)$$

where
- $T_R$: room temperature
- $T_{C1}$: Curie temperature of first layer
- $T_{C2}$: Curie temperature of second layer
- $T_L$: temperature of recording medium when low-level laser beam is radiated
- $T_H$: temperature of recording medium when high-level laser beam is radiated
- $H_{C1}$: coercivity of first layer
- $H_{C2}$: coercivity of second layer
- $M_{S1}$: saturated magnetic moment of first layer
- $M_{S2}$: saturated magnetic moment of second layer
- $t_1$: film thickness of first layer
- $t_2$: film thickness of second layer
- $\sigma_w$: exchange coupling force
- Hini.: initial field 13. A medium according to claim 6, wherein said first layer consists of a transition metal rich transition metal-rare earth alloy having no compensation temperature between a room temperature and a Curie temperature, said second layer consists of a transition metal rich transition metal-rare earth alloy having no compensation temperature between the room temperature and the Curie temperature, said medium satisfies the following condition:

$$T_R < T_{C1} \approx T_L < T_{C2} \approx T_H \quad (1)$$

and, said medium satisfies the following conditions at the room temperature:

$$H_{C1} > H_{C2} + \frac{\sigma_w}{2M_{S1}t_1} + \frac{\sigma_w}{2M_{S2}t_2} \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < Hini. < H_{C1} - \frac{\sigma_w}{2M_{S1}t_1} \quad (5)$$

where
- $T_R$: room temperature
- $T_{C1}$: Curie temperature of first layer
- $T_{C2}$: Curie temperature of second layer
- $T_L$: temperature of recording medium when low-level laser beam is radiated
- $T_H$: temperature of recording medium when high-level laser beam is radiated
- $H_{C1}$: coercivity of first layer
- $H_{C2}$: coercivity of second layer
- $M_{S1}$: saturated magnetic moment of first layer
- $M_{S2}$: saturated magnetic moment of second layer
- $t_1$: film thickness of first layer
- $t_2$: film thickness of second layer
- $\sigma_w$: exchange coupling force
- Hini.: initial field 14. A medium according to claim 6, wherein said first layer consists of a transition metal rich transition metal-rare earth alloy having no compensation temperature between a room temperature and a Curie temperature, said second layer consists of a rare earth rich transition metal-rare earth alloy having a compensation temperature between the room temperature and the Curie temperature, said medium satisfies the following condition:

$$T_R < T_{C1} \approx T_L \approx T_{comp.2} < T_{C2} \approx T_H \quad (1)$$

and, said medium satisfies the following conditions at the room temperature:

$$H_{C1} > H_{C2} + \left| \frac{\sigma_w}{2M_{S1}t_1} - \frac{\sigma_w}{2M_{S2}t_2} \right| \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < \text{Hini.} < H_{C1} - \frac{\sigma_w}{2M_{S1}t_1} \quad (5)$$

where $T_R$: room temperature
$T_{comp.2}$: compensation temperature of second layer
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer
$t_1$: film thickness of first layer
$t_2$: film thickness of second layer
$\sigma_w$: exchange coupling force
Hini.: initial field

15. A medium according to claim 6, wherein said first layer consists of a transition metal rich transition metal-rare earth alloy having no compensation temperature between a room temperature and a Curie temperature, said second layer consists of a rare earth rich transition metal-rare earth alloy having no compensation temperature between the room temperature and the Curie temperature, said medium satisfies the following condition:

$$T_R < T_{C1} \approx T_L < T_{C2} \approx T_H \quad (1)$$

and, said medium satisfies the following conditions at the room temperature:

$$H_{C1} > H_{C2} + \left| \frac{\sigma_w}{2M_{S1}t_1} - \frac{\sigma_w}{2M_{S2}t_2} \right| \quad (2)$$

$$H_{C1} > \frac{\sigma_w}{2M_{S1}t_1} \quad (3)$$

$$H_{C2} > \frac{\sigma_w}{2M_{S2}t_2} \quad (4)$$

$$H_{C2} + \frac{\sigma_w}{2M_{S2}t_2} < \text{Hini.} < H_{C1} - \frac{\sigma_w}{2M_{S1}t_1} \quad (5)$$

where $T_R$: room temperature
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated
$H_{C1}$: coercivity of first layer
$H_{C2}$: coercivity of second layer
$M_{S1}$: saturated magnetic moment of first layer
$M_{S2}$: saturated magnetic moment of second layer
$t_1$: film thickness of first layer
$t_2$: film thickness of second layer
$\sigma_w$: exchange coupling force
Hini.: initial field

* * * * *